United States Patent
Zhang et al.

(10) Patent No.: US 12,517,098 B2
(45) Date of Patent: Jan. 6, 2026

(54) MONITORING POLYSORBATE HYDROLYSIS IN PHARMACEUTICAL FORMULATIONS USING AN ULTRASENSITIVE EXTRACTION-FREE FATTY ACID QUANTITATION METHOD

(71) Applicant: Regeneron Pharmaceuticals, Inc., Tarrytown, NY (US)

(72) Inventors: Sisi Zhang, White Plains, NY (US); Hui Xiao, Scarsdale, NY (US); Ning Li, New Canaan, CT (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 670 days.

(21) Appl. No.: 17/840,509

(22) Filed: Jun. 14, 2022

(65) Prior Publication Data

US 2022/0397559 A1    Dec. 15, 2022

Related U.S. Application Data

(60) Provisional application No. 63/210,340, filed on Jun. 14, 2021.

(51) Int. Cl.
  *G01N 30/72* (2006.01)
  *G01N 30/06* (2006.01)
  *G01N 33/68* (2006.01)

(52) U.S. Cl.
  CPC ........ *G01N 30/7233* (2013.01); *G01N 30/06* (2013.01); *G01N 33/6848* (2013.01)

(58) Field of Classification Search
  CPC .............. G01N 30/7233; G01N 30/06; G01N 33/6848; G01N 33/92
  See application file for complete search history.

(56) References Cited

U.S. PATENT DOCUMENTS

| | | | |
|---|---|---|---|
| 10,534,008 B2 * | 1/2020 | Goldman | H01J 49/004 |
| 11,241,499 B2 * | 2/2022 | Kim | A61K 9/0019 |
| 2021/0155656 A1 * | 5/2021 | Falkenstein | C07K 1/22 |
| 2022/0404336 A1 * | 12/2022 | Greka | G01N 33/5023 |
| 2024/0002430 A1 * | 1/2024 | Falkenstein | C07K 16/40 |

FOREIGN PATENT DOCUMENTS

WO    WO-2024167794 A1 *    8/2024 ............. G01N 30/88

OTHER PUBLICATIONS

Zhang Lin et al: "Degradation Mechanisms of Polysorbate 20 Differentiated by18O-labeling and Mass Spectrometry", Pharmaceutical Research, Springer US, New York, vol. 34, No. 1, Oct. 13, 2016 (Oct. 13, 2016), pp. 84-100.

(Continued)

*Primary Examiner* — Octavia Hollington
(74) *Attorney, Agent, or Firm* — Schwabe, Williamson & Wyatt PC; David Mellman

(57) ABSTRACT

The present invention generally pertains to methods of quantifying free fatty acids in a pharmaceutical formulation. In particular, the present invention pertains to a method of quantifying free fatty acids released from polysorbate hydrolysis in a pharmaceutical formulation comprising a pharmaceutical product, polysorbate and free fatty acids, using liquid chromatography-mass spectrometry, without the use of an extraction step.

25 Claims, 31 Drawing Sheets sorbitan-esters isosorbide esters

Lauric acid C(12:0)

Oleic acid C(18:1)

POE sorbitan mono ester → PEG-sorbitan complexation + Fatty acid

(56) References Cited

OTHER PUBLICATIONS

Zhang Lin et al: "Dual Effect of Histidine on Polysorbate 20 Stability: Mechanistic Studies", Pharmaceutical Research, Springer US, New York, vol. 35, No. 2, Jan. 16, 2018 (Jan. 16, 2018), pp. 1-18.

Honemann Maximilian N. et al: "Monitoring polysorbate hydrolysis in biopharmaceuticals using a QC-ready free fatty acid quantification method", Journal of Chromatography B, vol. 1116, Mar. 26, 2019 (Mar. 26, 2019), pp. 1-8.

Zhang Sisi et al: "Monitoring polysorbate hydrolysis in therapeutic proteins using an ultrasensitive extraction-free fatty acid quantitation method", Analytical Biochemistry, Academic Press, Amsterdam, NL, vol. 637, Nov. 18, 2021 (Nov. 18, 2021).

International Search Report and Written Opinion, PCT Application No. PCT/US2022/033492, International Filing Date Jun. 14, 2022, Date of Mailing Oct. 21, 2022.

* cited by examiner $x+y+z+w=20$ sorbitan-esters isosorbide esters

R=

Lauric acid C(12:0)

R=

Oleic acid C(18:1)

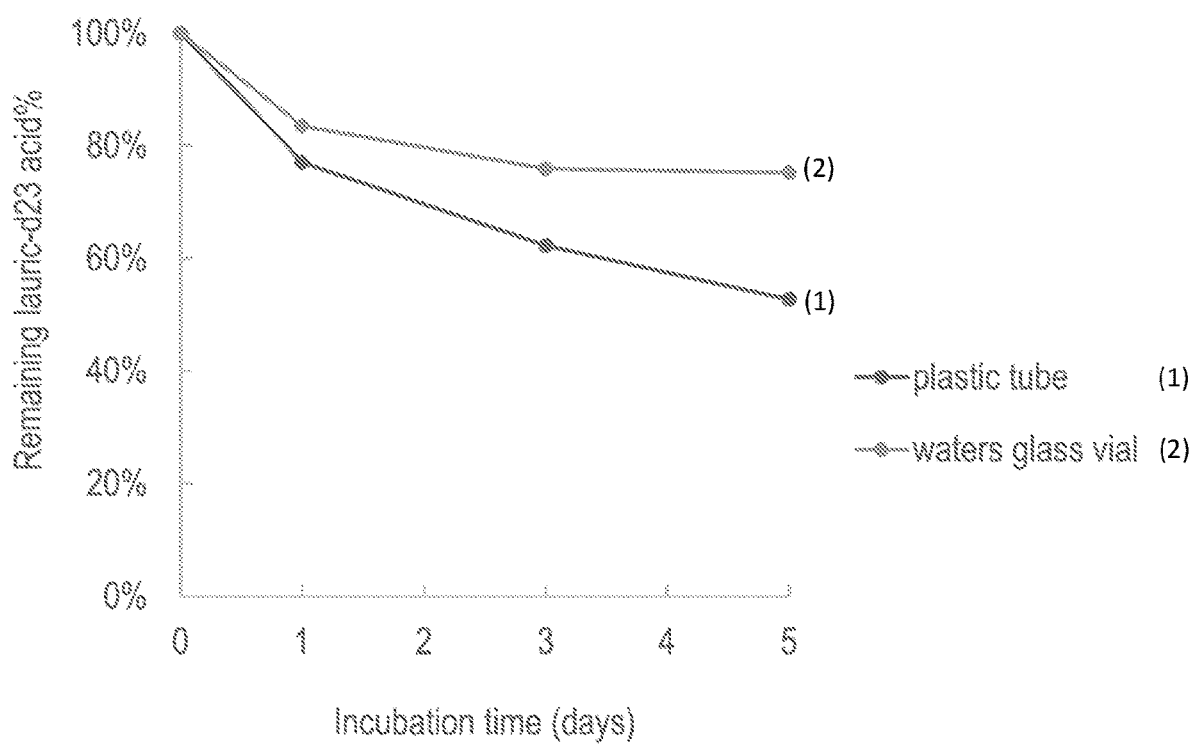

Lauric acid concentration without lauric-d23 acid correction

Myristic acid concentration without myristic-d27 acid correction

MONITORING POLYSORBATE HYDROLYSIS IN PHARMACEUTICAL FORMULATIONS USING AN ULTRASENSITIVE EXTRACTION-FREE FATTY ACID QUANTITATION METHOD

CROSS-REFERENCE TO RELATED APPLICATIONS

This application claims priority to and the benefit of U.S. Provisional Patent Application No. 63/210,340, filed Jun. 14, 2021 which is herein incorporated by reference.

FIELD

This application relates to assay methods for quantification of free fatty acids released from polysorbate hydrolysis in pharmaceutical formulations.

BACKGROUND

Among drug products, protein-based biotherapeutics are an important class of drugs that offer a high level of selectivity, potency and efficacy, as evidenced by the considerable increase in clinical trials with monoclonal antibodies (mAbs) over the past several years. One critical aspect for a clinically and commercially viable biotherapeutic is stability of the drug product in terms of the manufacturing process, as well as shelf-life. Surfactants, such as polysorbate, are often used to enhance the physical stability of a protein-based biotherapeutics product. Over seventy percent of marketed monoclonal antibody therapeutics contain between 0.001% and 0.1% polysorbate, a type of surfactant, to impart physical stability to the protein-based biotherapeutics.

Enzymatic hydrolysis of polysorbate has been recognized as the primary route of polysorbate degradation in biotherapeutics formulations, resulting in the release of free fatty acids that drive undesirable particulate formation. Quantitation of the released free fatty acids can be used to monitor the level of polysorbate degradation. Most recently, liquid chromatography-mass spectrometry (LC-MS) has been used as a sensitive detection method for free fatty acids. However, current methods of quantifying free fatty acids require an extraction step, such as solid phase extraction (SPE), before the sample can be subjected to chromatography and analyzed, which requires time-consuming extra processing of the sample and limits high-throughput analysis.

It will be appreciated that a need exists for improved methods of quantifying free fatty acids in a pharmaceutical formulation that do not require extraction of free fatty acids prior to analysis.

SUMMARY

Characterizing the degradation of polysorbates in pharmaceutical formulations is a critical issue in the production of stable pharmaceutical products. There exists a need for improved methods of reliably and efficiently quantifying free fatty acids in a pharmaceutical formulation. The present application provides methods to sensitively quantify free fatty acids in a pharmaceutical formulation without the need for an extraction step.

This disclosure provides a method for quantifying free fatty acids in a pharmaceutical formulation. In some exemplary embodiments, the method comprises (a) incubating a formulation comprising a pharmaceutical product, polysorbate, and free fatty acids; (b) subjecting said formulation to liquid chromatography to separate said free fatty acids; and (c) using a mass spectrometer to quantify said free fatty acids, wherein said free fatty acids are not extracted from said formulation prior to subjecting said formulation to liquid chromatography.

In one aspect, the method further comprises adding internal free fatty acid standards to the formulation prior to incubating the formulation. In another aspect, the method further comprises correcting the quantified free fatty acid concentrations to the internal standards. In yet another aspect, the method further comprises generating a calibration curve using spiked-in fatty acids of known concentration, wherein the quantified free fatty acid concentrations are corrected to the calibration curve.

In one aspect, the method further comprises repeating the steps of the method using at least one additional incubation time and comparing the quantification of free fatty acids obtained in each repetition to determine a rate of change of free fatty acid concentration over time.

In one aspect, the pharmaceutical product is a drug, a chemical compound, a nucleic acid, a toxin, a peptide, a protein, a fusion protein, an antibody, an antibody fragment, a Fab region of an antibody, an antibody-drug conjugate, or a protein pharmaceutical product. In a specific aspect, the pharmaceutical product is a monoclonal antibody. In another aspect, the concentration of the pharmaceutical product is between about 1 mg/mL and about 200 mg/mL.

In one aspect, the polysorbate is polysorbate 20 (PS20) or polysorbate 80 (PS80). In another aspect, the concentration of the polysorbate is between about 0.001% and about 1%. In a specific aspect, the concentration of the polysorbate is about 1%.

In one aspect, the free fatty acids are selected from a group comprising caprylic acid, capric acid, lauric acid, myristic acid, palmitic acid, oleic acid, stearic acid, linoleic acid, or a combination thereof. In another aspect, the concentration of the free fatty acids is between about 10 ng/mL and about 100 µg/mL.

In one aspect, the incubation is performed within a plastic tube or within a glass vial. In another aspect, the incubation is performed for between about 0 hours and about 36 months. In yet another aspect, the incubation is performed at between about 5° C. and about 37° C.

In one aspect, the internal standards are labeled with heavy isotopes. In a specific aspect, the internal standards are selected from a group comprising lauric-$d_{23}$ acid, myristic-$d_{27}$ acid, oleic acid-$^{13}C_{18}$, or a combination thereof.

In one aspect, the liquid chromatography system is coupled to the mass spectrometer. In another aspect, the liquid chromatography is reversed-phased chromatography. In a specific aspect, a column used for said reversed-phase chromatography is an Acquity UPLC BEH C4 column.

In one aspect, the mass spectrometer is an electrospray ionization mass spectrometer. In another aspect, the mass spectrometer is a triple quadrupole mass spectrometer. In yet another aspect, the mass spectrometer is capable of performing LC-MS or liquid chromatography-multiple reaction monitoring-mass spectrometry (LC-MRM-MS) analyses.

In one aspect, the formulation additionally comprises one or more excipients. In a further aspect, the formulation additionally comprises histidine.

These, and other, aspects of the invention will be better appreciated and understood when considered in conjunction with the following description and accompanying drawings. The following description, while indicating various embodiments and numerous specific details thereof, is given by way of illustration and not of limitation. Many substitutions, modifications, additions, or rearrangements may be made within the scope of the invention.

BRIEF DESCRIPTION OF THE DRAWINGS

FIG. 6A shows a percent loss of lauric-$d_{23}$ acid over time in a plastic tube (1) or a glass vial (2) according to an exemplary embodiment.

DETAILED DESCRIPTION

Figure 1A:
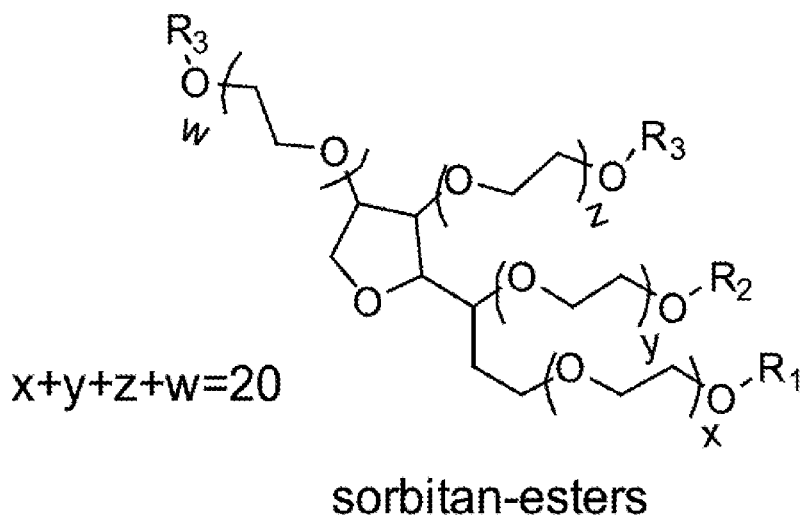
FIG. 1A shows a diagram of chemical structures of major expected polyethylene oxide (POE) esters in polysorbates according to an exemplary embodiment.
Figure 1A:
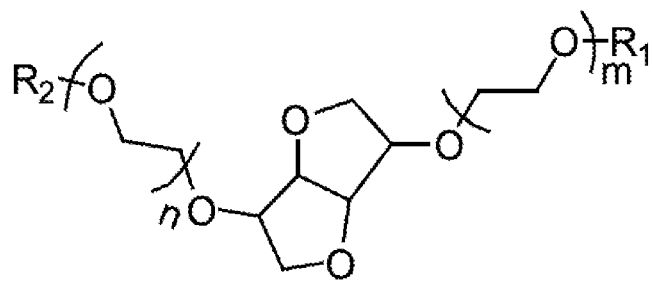
Figure 1A:
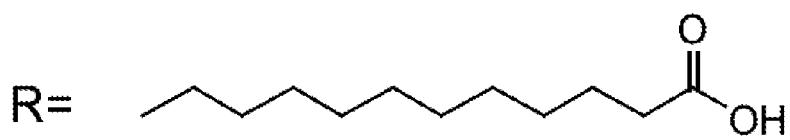
Figure 1A:
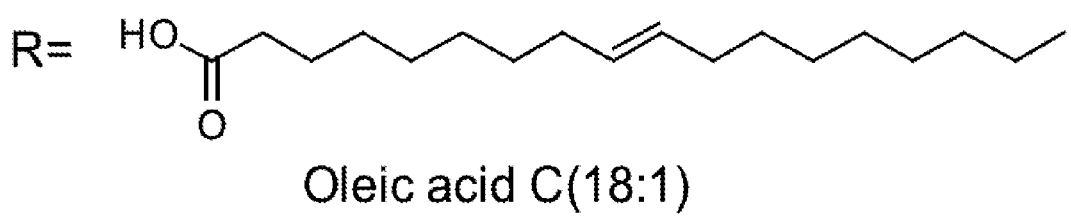

Polysorbate 20 (PS20) and polysorbate 80 (PS80) are the most commonly used nonionic surfactants in biopharmaceutical protein formulations for improving protein stability and protecting protein products from aggregation and denaturation (Martos et al., *J Pharm Sci.* 106(7):1722-1735 (2017); Kiese et al., *J Pharm Sci* 97(19):4347-4366 (2008); Dwivedi et al., *Int J Pharm* 552(1-2):422-436 (2018)). The primary structures of PS20 and PS80 are monolaurate and monooleate, with each consisting of a sorbitan head group with the polyethylene oxide (POE) chains esterified by lauric acid (C12:0) and oleic acid (C18:1), respectively, as shown in FIG. 1A. The compositions of the fatty acids esterified in PS20 and PS80 are listed in Table 1 (Martos et al.). Typical polysorbate (PS) concentrations in drug products range from 0.001% to 0.1% (w/v) in order to maintain protein stability over their shelf life (Martos et al.).

TABLE 1

Fatty acid compositions of PS20 and PS80

| Fatty acid | Abbreviation | PS20 Percentage | PS80 Percentage |
|---|---|---|---|
| Caprylic acid | C8:0 | <10 | — |
| Capric acid | C10:0 | <10 | — |
| Lauric acid | C12:0 | 40-60 | — |
| Myristic acid | C14:0 | 14-25 | <5 |

TABLE 1-continued

Fatty acid compositions of PS20 and PS80

| Fatty acid | Abbreviation | PS20 Percentage | PS80 Percentage |
|---|---|---|---|
| Palmitic acid | C16:0 | 7-15 | <16 |
| Oleic acid | C18:1 | <11 | >58 |
| Stearic acid | C18:0 | <7 | <6 |
| Linoleic acid | C18:2 | <3 | <18 |

Figure 1B:
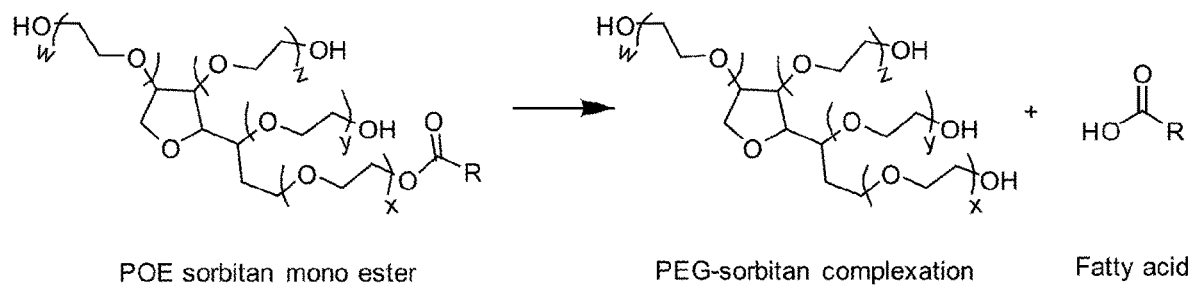
FIG. 1B shows a diagram of hydrolysis of polysorbates and formation of free fatty acids (FFA) according to an exemplary embodiment.

PSs are known to be liable to degradation via two main pathways: autooxidation and hydrolysis (Dwivedi et al.; Kishore et al., *Pharm Res.* 28(5): 1194-1210 (2011); Larson et al., *J Pharm Sci.* 109(10):633-639 (2020); Kishore et al. *J Pharm Sci.* 100(2):721-731 (2011)). Enzymatic hydrolysis is considered to be the primary route of PS degradation in high-concentration protein formulations, which results in the accumulation of free fatty acids (FFAs) that drive undesirable particulate formation in the drug products, as shown in FIG. 1B. Oxidation is the second primary pathway for PS degradation, which leads to the formation of peroxides, aldehydes, ketones and short-chain esterified POE sorbitan/isosorbide species (Kishore et al. 2011a; Larson et al.; Kishore et al. 2011b; Donbrow et al., *J Pharm Sci.* 67(12): 1676-1681 (1978); Yao et al. *Pharm Res.* 26(10):2303-2313 (2009)). PS hydrolysis has been recognized as a larger threat to drug product quality because this process not only reduces the PS concentration, but is also associated with particulate formation due to the low solubility of accumulated FFAs, especially at storage temperatures of 2° C.-8° C. (Doshi et al., *J Pharm Sci.* 110(2):687-692 (2021); Saggu et al., *J Pharm Sci.* 110(3):1093-1102 (2021); Doshi et al. *Mol Pharm.* 12(11):3792-3804 (2015)).

Residual lipases or esterase present in drug product are the major cause of PS hydrolysis (Chiu et al., *Biotechnol Bioeng.* 114(5):1006-1015 (2017); Hall et al. *J Pharm Sci.* 105(5):1633-1642 (2016); Labrenz et al. *J Pharm Sci.* 103(8):2268-2277 (2014); McShan et al. *PDA J Pharm Sci Technol.* 70(4):332-345 (2016); Zhang et al. *J Pharm Sci.* 109(11):3300-3307 (2020); Zhang et al. *J Pharm Sci.* 109 (9):2710-2718 (2020)). The levels of residual lipases in final drug product are usually very low (<10 ppm) after multiple steps of downstream purification, and the consequences of PS degradation are not noticeable until after storage for months or years at typical storage temperatures (2° C.-8° C.). Therefore, it is desirable to monitor this low lipase activity in accelerated conditions under which the lipase activity can be observed at an earlier time point.

A variety of assays have been developed to directly or indirectly measure PS degradation by quantitating PS species or FFAs. Direct quantitation of PS is usually performed by fluorescence micelle assay (Brito et al. *Anal Biochem.* 152(2):250-255 (1986); Khossravi et al. *Pharm Res.* 19(5): 634-639 (2002)), liquid chromatography-charged aerosol detection (LC-CAD) (Hewitt et al. *J Chromatogr A.* 1215 (1-2):156-160 (2008)), evaporative light scattering detection (Zhang et al. *J Chromatogr Sci.* 50(7):598-607 (2012)), or LC-mass spectrometry (LC-MS) profiling (Khossravi et al.; Zhang et al. 2012; Borisov et al. *Anal Chem.* 83(10):3934-3942 (2011); Hvattum et al. *J Pharm Biomed Anal.* 62:7-16 (2012); Borisov et al. *J Pharm Sci.* 104(3):1005-1018 (2015)). In indirect PS quantitation, FFAs are usually measured spectrophotometrically after extraction and derivatization (Tomlinson et al., *Mol Pharm.* 12(11):3805-3815 (2015)). However, most of these methods are lacking in either precision, sensitivity, accuracy and/or throughput.

For example, PS quantitation with high-performance LC-CAD (HPLC-CAD) is known to lack precision, as the typical percent relative standard deviation (% RSD) for a CAD signal is 11% (Soliven et al. *J Pharm Biomed Anal.* 143:68-76 (2017); Honemann et al. *J Chromatogr B Analyt Technol Biomed Life Sci.* 1116:1-8 (2019)), which limits the application of this technique for detecting small changes in PS content. Quantitation of FFAs generated from PS hydrolysis has been proposed by Tomlinson et al. and adapted by several groups (Tomlinson et al.). However, this method has a low throughput with high variability, as it involves solid phase extraction and derivatization of FFAs, which requires multiple steps of sample preparation. Recently, a few groups applied a more sensitive method, LC-MS, for quantitation of the FFA contents released in drug products and demonstrated that this method can serve as a sensitive and reliable quantitation technique for PS degradation (Honemann et al.; Puschmann et al. *J Chromatogr A.* 1599:136-143 (2019); Cheng et al. *J Pharm. Sci* 108(8):2880-2886 (2019)). However, all of these methods require an extraction step before MS detection, which is time-consuming.

Disclosed herein is an extraction-free quantitative method that can be used to detect small changes in polysorbate levels. The incubation conditions are optimized to maximize the detection of FFAs and to minimize the loss of FFAs from physical adsorption. In addition, an internal standard (ISTD) is introduced before incubation to ensure accurate quantitation. The Examples described below demonstrate that this approach allows for the detection of low levels of PS degradation within 1 day in multiple drug products. The optimized incubation conditions can be applied to either PS20 or PS80 degradation, regardless of which lipases are present. A method is also provided for deriving a model to predict long-term degradation of polysorbates at typical storage conditions using measured release of FFAs in a short period of time in accelerated storage conditions.

Unless described otherwise, all technical and scientific terms used herein have the same meaning as commonly understood by one of ordinary skill in the art to which this invention belongs. Although any methods and materials similar or equivalent to those described herein can be used in the practice or testing, particular methods and materials are now described.

The term "a" should be understood to mean "at least one" and the terms "about" and "approximately" should be understood to permit standard variation as would be understood by those of ordinary skill in the art and where ranges are provided, endpoints are included. As used herein, the terms "include," "includes," and "including" are meant to be non-limiting and are understood to mean "comprise," "comprises," and "comprising" respectively.

In some exemplary embodiments, the disclosure provides a method for quantifying free fatty acids in a pharmaceutical formulation. A pharmaceutical formulation may comprise, for example, a pharmaceutical product, a polysorbate, and free fatty acids. A pharmaceutical formulation may comprise additional excipients. In some exemplary embodiments, an additional excipient is histidine.

As used herein, the term "composition" refers to a pharmaceutical product that is formulated together with one or more pharmaceutically acceptable vehicles.

As used herein, the term "a pharmaceutical product" can include a biologically active component of a drug product. A pharmaceutical product can refer to any substance or combination of substances used in a drug product, intended to furnish pharmacological activity or to otherwise have direct effect in the diagnosis, cure, mitigation, treatment or prevention of disease, or to have direct effect in restoring, correcting or modifying physiological functions in animals. Non-limiting methods to prepare a pharmaceutical product can include using fermentation process, recombinant DNA, isolation and recovery from natural resources, chemical synthesis, or combinations thereof. In some exemplary embodiments, the pharmaceutical product is a drug, a chemical compound, a nucleic acid, a toxin, a peptide, a protein, a fusion protein, an antibody, an antibody fragment, a Fab region of an antibody, an antibody-drug conjugate, or a protein pharmaceutical product.

In some exemplary embodiments, the concentration of a pharmaceutical product in the formulation can be about 1 mg/mL, about 2 mg/mL, about 3 mg/mL, about 4 mg/mL, about 5 mg/mL, about 6 mg/mL, about 7 mg/mL, about 8 mg/mL, about 9 mg/mL, about 10 mg/mL, about 15 mg/mL, about 20 mg/mL, about 30 mg/mL, about 40 mg/mL, about 50 mg/mL, about 60 mg/mL, about 70 mg/mL, about 80 mg/mL, about 90 mg/mL, about 100 mg/mL, about 110 mg/mL, about 120 mg/mL, about 130 mg/mL, about 140 mg/mL, about 150 mg/mL, about 160 mg/mL, about 170 mg/mL, about 180 mg/mL, about 190 mg/mL, or about 200 mg/mL.

As used herein, the term "protein" or "pharmaceutical protein product" can include any amino acid polymer having covalently linked amide bonds. Proteins comprise one or more amino acid polymer chains, generally known in the art as "polypeptides." "Polypeptide" refers to a polymer composed of amino acid residues, related naturally occurring structural variants, and synthetic non-naturally occurring analogs thereof linked via peptide bonds, related naturally occurring structural variants, and synthetic non-naturally occurring analogs thereof "Synthetic peptides or polypeptides" refers to a non-naturally occurring peptide or polypeptide. Synthetic peptides or polypeptides can be synthesized, for example, using an automated polypeptide synthesizer. Various solid phase peptide synthesis methods are known to those of skill in the art. A protein may comprise one or multiple polypeptides to form a single functioning biomolecule. A protein can include antibody fragments, nanobodies, recombinant antibody chimeras, cytokines, chemokines, peptide hormones, and the like. Proteins of interest can include any of bio-therapeutic proteins, recombinant proteins used in research or therapy, trap proteins and other chimeric receptor Fc-fusion proteins, chimeric proteins, antibodies, monoclonal antibodies, polyclonal antibodies, human antibodies, and bispecific antibodies. Proteins may be produced using recombinant cell-based production systems, such as the insect bacculovirus system, yeast systems (e.g., Pichia sp.), mammalian systems (e.g., CHO cells and CHO derivatives like CHO-K1 cells). For a recent review discussing biotherapeutic proteins and their production, see Ghaderi et al., "Production platforms for biotherapeutic glycoproteins. Occurrence, impact, and challenges of non-human sialylation" (Darius Ghaderi et al., *Production platforms for biotherapeutic glycoproteins. Occurrence, impact, and challenges of non-human sialylation,* 28 BIOTECHNOLOGY AND GENETIC ENGINEERING REVIEWS 147-176 (2012), the entire teachings of which are herein incorporated). Proteins can be classified on the basis of compositions and solubility and can thus include simple proteins, such as globular proteins and fibrous proteins; conjugated proteins, such as nucleoproteins, glycoproteins, mucoproteins, chromoproteins, phosphoproteins, metalloproteins, and lipoproteins; and derived proteins, such as primary derived proteins and secondary derived proteins.

In some exemplary embodiments, a pharmaceutical protein product can be a recombinant protein, an antibody, a bispecific antibody, a multispecific antibody, antibody fragment, monoclonal antibody, fusion protein, scFv and combinations thereof.

As used herein, the term "recombinant protein" refers to a protein produced as the result of the transcription and translation of a gene carried on a recombinant expression vector that has been introduced into a suitable host cell. In certain exemplary embodiments, the recombinant protein can be an antibody, for example, a chimeric, humanized, or fully human antibody. In certain exemplary embodiments, the recombinant protein can be an antibody of an isotype selected from group consisting of: IgG (e.g., IgG1, IgG2, IgG3, IgG4), IgM, IgA1, IgA2, IgD, or IgE. In certain exemplary embodiments the antibody molecule is a full-length antibody (e.g., an IgG1 or IgG4 immunoglobulin) or alternatively the antibody can be a fragment (e.g., an Fc fragment or a Fab fragment).

The term "antibody," as used herein includes immunoglobulin molecules comprising four polypeptide chains, two heavy (H) chains and two light (L) chains inter-connected by disulfide bonds, as well as multimers thereof (e.g., IgM). Each heavy chain comprises a heavy chain variable region (abbreviated herein as HCVR or VH) and a heavy chain constant region. The heavy chain constant region comprises three domains, CH1, CH2 and CH3. Each light chain comprises a light chain variable region (abbreviated herein as LCVR or VL) and a light chain constant region. The light chain constant region comprises one domain (CL1). The VH and VL regions can be further subdivided into regions of hypervariability, termed complementarity determining regions (CDRs), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, and FR4. In different embodiments of the invention, the FRs of the anti-big-ET-1 antibody (or antigen-binding portion thereof) may be identical to the human germline sequences or may be naturally or artificially modified. An amino acid consensus sequence may be defined based on a side-by-side analysis of two or more CDRs. The term "antibody," as used herein, also includes antigen-binding fragments of full antibody molecules. The terms "antigen-binding portion" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. Antigen-binding fragments of an antibody may be derived, for example, from full antibody molecules using any suitable standard techniques such as proteolytic digestion or recombinant genetic engineering techniques involving the manipulation and expression of DNA encoding antibody variable and optionally constant domains. Such DNA is known and/or is readily available from, for example, commercial sources, DNA libraries (including, e.g., phage-antibody libraries), or can be synthesized. The DNA may be sequenced and manipulated chemically or by using molecular biology techniques, for example, to arrange one or more variable and/or constant domains into a suitable configuration, or to introduce codons, create cysteine residues, modify, add or delete amino acids, etc.

As used herein, an "antibody fragment" includes a portion of an intact antibody, such as, for example, the antigen-binding or variable region of an antibody. Examples of antibody fragments include, but are not limited to, a Fab fragment, a Fab' fragment, a F(ab')2 fragment, a scFv fragment, a Fv fragment, a dsFv diabody, a dAb fragment, a Fd' fragment, a Fd fragment, and an isolated complementarity determining region (CDR) region, as well as triabodies, tetrabodies, linear antibodies, single-chain antibody molecules, and multi specific antibodies formed from antibody fragments. Fv fragments are the combination of the variable regions of the immunoglobulin heavy and light chains, and ScFv proteins are recombinant single chain polypeptide molecules in which immunoglobulin light and heavy chain variable regions are connected by a peptide linker. In some exemplary embodiments, an antibody fragment comprises a sufficient amino acid sequence of the parent antibody of which it is a fragment that it binds to the same antigen as does the parent antibody; in some exemplary embodiments, a fragment binds to the antigen with a comparable affinity to that of the parent antibody and/or competes with the parent antibody for binding to the antigen. An antibody fragment may be produced by any means. For example, an antibody fragment may be enzymatically or chemically produced by fragmentation of an intact antibody and/or it may be recombinantly produced from a gene encoding the partial antibody sequence. Alternatively, or additionally, an antibody fragment may be wholly or partially synthetically produced. An antibody fragment may optionally comprise a single chain antibody fragment. Alternatively, or additionally, an antibody fragment may comprise multiple chains that are linked together, for example, by disulfide linkages. An antibody fragment may optionally comprise a multi-molecular complex. A functional antibody fragment typically comprises at least about 50 amino acids and more typically comprises at least about 200 amino acids.

The term "bispecific antibody" includes an antibody capable of selectively binding two or more epitopes. Bispecific antibodies generally comprise two different heavy chains with each heavy chain specifically binding a different epitope—either on two different molecules (e.g., antigens) or on the same molecule (e.g., on the same antigen). If a bispecific antibody is capable of selectively binding two different epitopes (a first epitope and a second epitope), the affinity of the first heavy chain for the first epitope will generally be at least one to two or three or four orders of magnitude lower than the affinity of the first heavy chain for the second epitope, and vice versa. The epitopes recognized by the bispecific antibody can be on the same or a different target (e.g., on the same or a different protein). Bispecific antibodies can be made, for example, by combining heavy chains that recognize different epitopes of the same antigen. For example, nucleic acid sequences encoding heavy chain variable sequences that recognize different epitopes of the same antigen can be fused to nucleic acid sequences encoding different heavy chain constant regions and such sequences can be expressed in a cell that expresses an immunoglobulin light chain.

A typical bispecific antibody has two heavy chains each having three heavy chain CDRs, followed by a CH1 domain, a hinge, a CH2 domain, and a CH3 domain, and an immunoglobulin light chain that either does not confer antigen-binding specificity but that can associate with each heavy chain, or that can associate with each heavy chain and that can bind one or more of the epitopes bound by the heavy chain antigen-binding regions, or that can associate with each heavy chain and enable binding of one or both of the heavy chains to one or both epitopes. BsAbs can be divided into two major classes, those bearing an Fc region (IgG-like) and those lacking an Fc region, the latter normally being smaller than the IgG and IgG-like bispecific molecules comprising an Fc. The IgG-like bsAbs can have different formats such as, but not limited to, triomab, knobs into holes IgG (kih IgG), crossMab, orth-Fab IgG, Dual-variable domains Ig (DVD-Ig), two-in-one or dual action Fab (DAF), IgG-single-chain Fv (IgG-scFv), or κλ-bodies. The non-IgG-like different formats include tandem scFvs, diabody format, single-chain diabody, tandem diabodies (TandAbs), Dual-affinity retargeting molecule (DART), DART-Fc, nanobodies, or antibodies produced by the dock-and-lock (DNL) method (Gaowei Fan, Zujian Wang & Mingju Hao, Bispecific antibodies and their applications, 8 JOURNAL OF HEMATOLOGY & ONCOLOGY 130; Dafne Muller & Roland E. Kontermann, Bispecific Antibodies, HANDBOOK OF THERAPEUTIC ANTIBODIES 265-310 (2014), the entire teachings of which are herein incorporated).

As used herein "multispecific antibody" refers to an antibody with binding specificities for at least two different antigens. While such molecules normally will only bind two antigens (e.g., bispecific antibodies, bsAbs), antibodies with additional specificities such as trispecific antibody and KIH Trispecific can also be addressed by the system and method disclosed herein.

The term "monoclonal antibody" as used herein is not limited to antibodies produced through hybridoma technology. A monoclonal antibody can be derived from a single clone, including any eukaryotic, prokaryotic, or phage clone, by any means available or known in the art. Monoclonal antibodies useful with the present disclosure can be prepared using a wide variety of techniques known in the art including the use of hybridoma, recombinant, and phage display technologies, or a combination thereof.

In some exemplary embodiments, a pharmaceutical protein product can be produced from mammalian cells. The mammalian cells can be of human origin or non-human origin, and can include primary epithelial cells (e.g., keratinocytes, cervical epithelial cells, bronchial epithelial cells, tracheal epithelial cells, kidney epithelial cells and retinal epithelial cells), established cell lines and their strains (e.g., 293 embryonic kidney cells, BHK cells, HeLa cervical epithelial cells and PER-C6 retinal cells, MDBK (NBL-1) cells, 911 cells, CRFK cells, MDCK cells, CHO cells, BeWo cells, Chang cells, Detroit 562 cells, HeLa 229 cells, HeLa S3 cells, Hep-2 cells, KB cells, LSI80 cells, LS174T cells, NCI-H-548 cells, RPMI2650 cells, SW-13 cells, T24 cells, WI-28 VA13, 2RA cells, WISH cells, BS-C-I cells, LLC-MK2 cells, Clone M-3 cells, 1-10 cells, RAG cells, TCMK-1 cells, Y-1 cells, LLC-PKi cells, PK(15) cells, GHi cells, GH3 cells, L2 cells, LLC-RC 256 cells, MHiCi cells, XC cells, MDOK cells, VSW cells, and TH-I, B1 cells, BSC-1 cells, RAf cells, RK-cells, PK-15 cells or derivatives thereof), fibroblast cells from any tissue or organ (including but not limited to heart, liver, kidney, colon, intestines, esophagus, stomach, neural tissue (brain, spinal cord), lung, vascular tissue (artery, vein, capillary), lymphoid tissue (lymph gland, adenoid, tonsil, bone marrow, and blood), spleen, and fibroblast and fibroblast-like cell lines (e.g., CHO cells, TRG-2 cells, IMR-33 cells, Don cells, GHK-21 cells, citrullinemia cells, Dempsey cells, Detroit 551 cells, Detroit 510 cells, Detroit 525 cells, Detroit 529 cells, Detroit 532 cells, Detroit 539 cells, Detroit 548 cells, Detroit 573 cells, HEL 299 cells, IMR-90 cells, MRC-5 cells, WI-38 cells, WI-26 cells, Midi cells, CHO cells, CV-1 cells, COS-1 cells, COS-3 cells, COS-7 cells, Vero cells, DBS-FrhL-2 cells, BALB/3T3 cells, F9 cells, SV-T2 cells, M-MSV-BALB/3T3 cells, K-BALB cells, BLO-11 cells, NOR-10 cells, C3H/IOTI/2 cells, HSDMiC3 cells, KLN205 cells, McCoy cells, Mouse L cells, Strain 2071 (Mouse L) cells, L-M strain (Mouse L) cells, L-MTK' (Mouse L) cells, NCTC clones 2472 and 2555, SCC-PSA1 cells, Swiss/3T3 cells, Indian muntjac cells, SIRC cells, Cn cells, and Jensen cells, Sp2/0, NS0, NS1 cells or derivatives thereof).

In some exemplary embodiments, the composition can be used for the treatment, prevention and/or amelioration of a disease or disorder. Exemplary, non-limiting diseases and disorders that can be treated and/or prevented by the administration of the pharmaceutical formulations of the present invention include, infections; respiratory diseases; pain resulting from any condition associated with neurogenic, neuropathic or nociceptic pain; genetic disorder; congenital disorder; cancer; herpetiformis; chronic idiopathic urticarial; scleroderma, hypertrophic scarring; Whipple's Disease; benign prostate hyperplasia; lung disorders, such as mild, moderate or severe asthma, allergic reactions; Kawasaki disease, sickle cell disease; Churg-Strauss syndrome; Grave's disease; pre-eclampsia; Sjogren's syndrome; autoimmune lymphoproliferative syndrome; autoimmune hemolytic anemia; Barrett's esophagus; autoimmune uveitis; tuberculosis; nephrosis; arthritis, including chronic rheumatoid arthritis; inflammatory bowel diseases, including Crohn's disease and ulcerative colitis; systemic lupus erythematosus; inflammatory diseases; HIV infection; AIDS; LDL apheresis; disorders due to PCSK9-activating mutations (gain of function mutations, "GOF"), disorders due to heterozygous Familial Hypercholesterolemia (heFH); primary hypercholesterolemia; dyslipidemia; cholestatic liver diseases; nephrotic syndrome; hypothyroidism; obesity; atherosclerosis; cardiovascular diseases; neurodegenerative diseases; neonatal Onset Multisystem Inflammatory Disorder (NOM ID/CINCA); Muckle-Wells Syndrome (MWS); Familial Cold Autoinflammatory Syndrome (FCAS); familial Mediterranean fever (FMF); tumor necrosis factor receptor-associated periodic fever syndrome (TRAPS); systemic onset juvenile idiopathic arthritis (Still's Disease); diabetes mellitus type 1 and type 2; auto-immune diseases; motor neuron disease; eye diseases; sexually transmitted diseases; tuberculosis; disease or condition which is ameliorated, inhibited, or reduced by a VEGF antagonist; disease or condition which is ameliorated, inhibited, or reduced by a PD-1 inhibitor; disease or condition which is ameliorated, inhibited, or reduced by a Interleukin antibody; disease or condition which is ameliorated, inhibited, or reduced by a NGF antibody; disease or condition which is ameliorated, inhibited, or reduced by a PCSK9 antibody; disease or condition which is ameliorated, inhibited, or reduced by a ANGPTL antibody; disease or condition which is ameliorated, inhibited, or reduced by an activin antibody; disease or condition which is ameliorated, inhibited, or reduced by a GDF antibody; disease or condition which is ameliorated, inhibited, or reduced by a Fel d 1 antibody; disease or condition which is ameliorated, inhibited, or reduced by a CD antibody; disease or condition which is ameliorated, inhibited, or reduced by a C5 antibody or combinations thereof.

In some exemplary embodiments, the composition can be administered to a patient. Administration may be via any route acceptable to those skilled in the art. Non-limiting routes of administration include oral, topical, or parenteral. Administration via certain parenteral routes may involve introducing the formulations of the present invention into the body of a patient through a needle or a catheter, propelled by a sterile syringe or some other mechanical device such as a continuous infusion system. A composition provided by the present invention may be administered using a syringe, injector, pump, or any other device recognized in the art for parenteral administration. A composition of the present invention may also be administered as an aerosol for absorption in the lung or nasal cavity. The compositions may also be administered for absorption through the mucus membranes, such as in buccal administration.

In some embodiments, the formulation can further comprise excipients including, but not limited to, buffering agents, bulking agents, tonicity modifiers, solubilizing agents, and preservatives. Other additional excipients can also be selected based on function and compatibility with the formulations may be found, for example in REMINGTON: THE SCIENCE AND PRACTICE OF PHARMACY, (2005); U. S. Pharmacopeia: National formulary; LOUIS SANFORD GOODMAN ET AL. , GOODMAN & GILMANS THE PHARMACOLOGICAL BASIS OF THERAPEUTICS (2001); KENNETH E. AVIS, HERBERT A. LIEBERMAN & LEON LACHMAN, PHARMACEUTICAL DOSAGE FORMS: PARENTERAL MEDICATIONS (1992); Praful Agrawala, Pharmaceutical Dosage Forms: Tablets. Volume 1, 79 Journal of Pharmaceutical Sciences 188 (1990); HERBERT A. LIEBERMAN, MARTIN M. RIEGER & GILBERT S. BANKER, PHARMACEUTICAL DOSAGE FORMS: DISPERSE SYSTEMS (1996); MYRA L. WEINER & LOIS A. KOTKOSKIE, EXCIPIENT TOXICITY AND SAFETY (2000), herein incorporated by reference in their entirety.

In some exemplary embodiments, the surfactant in the composition can be polysorbate. As used herein, "polysorbate" refers to a common excipient used in formulation development to protect antibodies against various physical stresses such as agitation, freeze-thaw processes, and air/water interfaces (Emily Ha, Wei Wang & Y. John Wang, Peroxide formation in polysorbate 80 and protein stability, 91 JOURNAL OF PHARMACEUTICAL SCIENCES 2252-2264 (2002); Bruce A. Kerwin, Polysorbates 20 and 80 Used in the Formulation of Protein Biotherapeutics: Structure and Degradation Pathways, 97 JOURNAL OF PHARMACEUTICAL SCIENCES 2924-2935 (2008); Hanns-Christian Mahler et al., Adsorption Behavior of a Surfactant and a Monoclonal Antibody to Sterilizing-Grade Filters, 99 Journal of Pharmaceutical Sciences 2620-2627 (2010)) and can include a non-ionic, amphipathic surfactant composed of fatty acid esters of polyoxyethylene-sorbitan. The esters can include polyoxyethylene sorbitan head group and either a saturated monolaurate side chain (polysorbate 20; PS20) or an unsaturated monooleate side chain (polysorbate 80; PS80). In some aspects, the polysorbate can be present in the formulation in the range of about 0.001% to 1% (weight/volume). Polysorbate can also contain a mixture of various fatty acid chains; for example, polysorbate 80 contains oleic, palmitic, myristic and stearic fatty acids, with the monooleate fraction making up approximately 58% of the polydisperse mixture (Nitin Dixit et al., Residual Host Cell Protein Promotes Polysorbate 20 Degradation in a Sulfatase Drug Product Leading to Free Fatty Acid Particles, 105 JOURNAL OF PHARMACEUTICAL SCIENCES 1657-1666 (2016)). Non-limiting examples of polysorbates include polysorbate-20, polysorbate-40, polysorbate-60, polysorbate-65, and polysorbate-80.

A polysorbate can be susceptible to auto-oxidation in a pH- and temperature-dependent manner, and additionally, exposure to UV light can also produce instability (Ravuri S. k. Kishore et al., Degradation of Polysorbates 20 and 80: Studies on Thermal Autoxidation and Hydrolysis, 100 JOURNAL OF PHARMACEUTICAL SCIENCES 721-731 (2011)), resulting in free fatty acids in solution along with the sorbitan head group. The free fatty acids resulting from polysorbate can include any aliphatic fatty acids with six to twenty carbons. Non-limiting examples of free fatty acids include oleic acid, palmitic acid, stearic acid, myristic acid, lauric acid, or combinations thereof.

In some exemplary aspects, the polysorbate can form free fatty acid particles. The free fatty acid particles can be at least about 5 µm in size. Further, these fatty acid particles can be classified according to their size as visible (about>100 µm), sub-visible (about<100 µm, which can be sub-divided into micron (1-100 µm) and submicron (100 nm-1000 nm)) and nanometer particles (about<100 nm) (Linda Narhi, Jeremy Schmit & Deepak Sharma, Classification of protein aggregates, 101 JOURNAL OF PHARMACEUTICAL SCIENCES 493-498). In some exemplary aspects, the fatty acid particles can be visible particles. Visible particles can be determined by visual inspection. In some exemplary embodiments, the fatty acid particles can be sub-visible particles. Subvisible particles can be monitored by the light blockage method according to United States Pharmacopeia (USP). An increase in fatty acid particles may cause a product to no longer be of acceptable quality, and therefore a rate of increase of fatty acid particles may be used as a measure of product shelf life. Fatty acid particles may form when free fatty acids are released into a formulation and exceed a concentration at which they are soluble, thereby precipitating out of solution. Therefore, measuring a degradation of polysorbate or a concentration of released free fatty acids may be indicators of the formation of fatty acid particles, and by extension of predicted product shelf life.

In some exemplary aspects, the concentration of polysorbate in the formulation can be about 0.001% w/v, about 0.002% w/v, about 0.003% w/v, about 0.004% w/v, about 0.005% w/v, about 0.006% w/v, about 0.007% w/v, about 0.008% w/v, about 0.009% w/v, about 0.01% w/v, about 0.015% w/v, about 0.02% w/v, 0.025% w/v, about 0.03% w/v, about 0.035% w/v, about 0.04% w/v, about 0.045% w/v, about 0.05% w/v, about 0.06% w/v, about 0.07% w/v, about 0.08% w/v, about 0.09% w/v, about 0.1% w/v, about 0.2% w/v, about 0.3% w/v, about 0.4% w/v, about 0.5% w/v, about 0.6% w/v, about 0.7% w/v, about 0.8% w/v, about 0.9% w/v, or about 1% w/v. In an exemplary embodiment, the concentration of polysorbate in the formulation is about 1% w/v.

In some exemplary aspects, the concentration of free fatty acids in the formulation can be about 10 ng/mL, about 20 ng/mL, about 30 ng/mL, about 40 ng/mL, about 50 ng/mL, about 60 ng/mL, about 70 ng/mL, about 80 ng/mL, about 90 ng/mL, about 100 ng/mL, about 200 ng/mL, about 300 ng/mL, about 400 ng/mL, about 500 ng/mL, about 600 ng/mL, about 700 ng/mL, about 800 ng/mL, about 900 ng/mL, about 1 µg/mL, about 2 µg/mL, about 3 µg/mL, about 4 µg/mL, about 5 µg/mL, about 6 µg/mL, about 7 µg/mL, about 8 µg/mL, about 9 µg/mL, about 10 µg/mL, about 20 µg/mL, about 30 µg/mL, or about 40 µg/mL.

In some exemplary aspects, the polysorbate can be degraded by a host-cell protein present in the composition. As used herein, the term "host-cell protein" includes protein derived from the host cell and can be unrelated to the desired pharmaceutical product. Host-cell protein can be a process-related impurity which can be derived from the manufacturing process and can include the three major categories: cell substrate-derived, cell culture-derived and downstream derived. Cell substrate-derived impurities include, but are not limited to, proteins derived from the host organism and nucleic acid (host cell genomic, vector, or total DNA). Cell culture-derived impurities include, but are not limited to, inducers, antibiotics, serum, and other media components. Downstream-derived impurities include, but are not limited to, enzymes, chemical and biochemical processing reagents (e.g., cyanogen bromide, guanidine, oxidizing and reducing agents), inorganic salts (e.g., heavy metals, arsenic, nonmetallic ion), solvents, carriers, ligands (e.g., monoclonal antibodies), and other leachables. In some exemplary embodiments, the host cell protein may be a lipase or esterase. Residual lipase activity in a formulation may be indirectly assessed by measuring polysorbate degradation, release of free fatty acids, or a concentration of visible or subvisible fatty acid particles.

As used herein, the term "liquid chromatography" refers to a process in which a biological/chemical mixture carried by a liquid can be separated into components as a result of differential distribution of the components as they flow through (or into) a stationary liquid or solid phase. Non-limiting examples of liquid chromatography include reverse phase liquid chromatography, ion-exchange chromatography, size exclusion chromatography, affinity chromatography, hydrophobic interaction chromatography, hydrophilic interaction chromatography, or mixed-mode chromatography. In an exemplary embodiment, a butyl reversed phase column is used. In an exemplary embodiment, an Acquity UPLC BEH C4 column is used.

As used herein, the term "mass spectrometer" includes a device capable of identifying specific molecular species and measuring their accurate masses. The term is meant to include any molecular detector into which a polypeptide or peptide may be characterized. A mass spectrometer can include three major parts: the ion source, the mass analyzer, and the detector. The role of the ion source is to create gas phase ions. Analyte atoms, molecules, or clusters can be transferred into gas phase and ionized either concurrently (as in electrospray ionization) or through separate processes. The choice of ion source depends on the application. In some exemplary embodiments, the mass spectrometer can be a tandem mass spectrometer. As used herein, the term "tandem mass spectrometry" includes a technique where structural information on sample molecules is obtained by using multiple stages of mass selection and mass separation. A prerequisite is that the sample molecules be transformed into a gas phase and ionized so that fragments are formed in a predictable and controllable fashion after the first mass selection step. Multistage MS/MS, or MS$^n$, can be performed by first selecting and isolating a precursor ion (MS$^2$), fragmenting it, isolating a primary fragment ion (MS$^3$), fragmenting it, isolating a secondary fragment (MS$^4$), and so on, as long as one can obtain meaningful information, or the fragment ion signal is detectable. Tandem MS has been successfully performed with a wide variety of analyzer combinations. What analyzers to combine for a certain application can be determined by many different factors, such as sensitivity, selectivity, and speed, but also size, cost, and availability. The two major categories of tandem MS methods are tandem-in-space and tandem-in-time, but there are also hybrids where tandem-in-time analyzers are coupled in space or with tandem-in-space analyzers. A tandem-in-space mass spectrometer comprises an ion source, a precursor ion activation device, and at least two non-trapping mass analyzers. Specific m/z separation functions can be designed so that in one section of the instrument ions are selected, dissociated in an intermediate region, and the product ions are then transmitted to another analyzer for m/z separation and data acquisition. In tandem-in-time, mass spectrometer ions produced in the ion source can be trapped, isolated, fragmented, and m/z separated in the same physical device.

In some aspects, the mass spectrometer in the method or system of the present application can be an electrospray ionization mass spectrometer, nano-electrospray ionization mass spectrometer, or a triple quadrupole mass spectrometer, wherein the mass spectrometer can be coupled to a liquid chromatography system, wherein the mass spectrometer is capable of performing LC-MS (liquid chromatography-mass spectrometry) or LC-MRM-MS (liquid chromatography-multiple reaction monitoring-mass spectrometry) analyses.

As used herein, the term "mass analyzer" includes a device that can separate species, that is, atoms, molecules, or clusters, according to their mass. Non-limiting examples of mass analyzers that could be employed are time-of-flight (TOF), magnetic electric sector, quadrupole mass filter (Q), quadrupole ion trap (QIT), orbitrap, Fourier transform ion cyclotron resonance (FTICR), and also the technique of accelerator mass spectrometry (AMS).

As used herein, the term "electrospray ionization" or "ESI" refers to the process of spray ionization in which either cations or anions in solution are transferred to the gas phase via formation and desolvation at atmospheric pressure of a stream of highly charged droplets that result from applying a potential difference between the tip of the electrospray needle containing the solution and a counter electrode. There are generally three major steps in the production of gas-phase ions from electrolyte ions in solution. These are: (a) production of charged droplets at the ES infusion tip; (b) shrinkage of charged droplets by solvent evaporation and repeated droplet disintegrations leading to small highly charged droplets capable of producing gas-phase ions; and (c) the mechanism by which gas-phase ions are produced from very small and highly charged droplets. Stages (a)-(c) generally occur in the atmospheric pressure region of the apparatus. In some exemplary embodiments, the electrospray ionization mass spectrometer can be a nano-electrospray ionization mass spectrometer.

As used herein, the term "extraction" refers to a process used to separate compounds from other compounds in a mixture based on their distinctive physical and chemical properties. There a number of types of extraction based on the type of mixture and type of compound being separated, including, for example, solid-phase extraction (SPE), liquid-liquid extraction (LLE), or electroextraction (EE). Current methods of free fatty acid quantitation rely on extraction of free fatty acids from a formulation before analysis by, for example, LC-MS. This extraction step simplifies the components of the sample for analysis, but at the cost of introducing time-intensive steps and possible variation in results. In some exemplary embodiments, the present application describes a method for quantifying free fatty acids in a formulation without an extraction step.

This disclosure provides a method for quantifying free fatty acids in a pharmaceutical formulation. In some exemplary embodiments, the method comprises (a) incubating a formulation comprising a pharmaceutical product, polysorbate, and free fatty acids; (b) subjecting said formulation to liquid chromatography to separate said free fatty acids; and (c) using a mass spectrometer to quantify said free fatty acids, wherein said free fatty acids are not extracted from said formulation prior to subjecting said formulation to liquid chromatography.

In some aspects, said quantification of free fatty acids is used as a measurement of degradation of said polysorbate. In some aspects, said quantification of free fatty acids is used as a measurement of residual lipase activity in said pharmaceutical formulation. In some aspects, said quantification of free fatty acids is used as a measurement of fatty acid particle formation. In some aspects, said quantification of free fatty acids is used to predict a shelf life of said pharmaceutical formulation. A shelf life may be predicted based on an increased concentration of free fatty acid particles above a concentration at which they are soluble, which may result in fatty acid particle formation and the unacceptability of the pharmaceutical formulation for use.

In some aspects, a concentration of polysorbate in the pharmaceutical formulation may be optimized to improve measurement of free fatty acids. As described in Example 1, an excessively high concentration of polysorbate may cause ion suppression and dilution of the pharmaceutical product. However, an excessively low concentration may cause undue loss of released FFAs to adsorption. In one aspect, an optimized concentration of polysorbate is about 1%.

Equations 1 and 2, set forth in Example 5 below, provide a model for using the extraction-free method of the present invention to predict long-term FFA release and PS degradation. For example, the quantification method of the present invention can be applied to a formulation in accelerated storage conditions, for example at about 37° C., and typical storage conditions, for example at about 5° C. A linear equation may be derived to express the equivalent number of months at about 5° C. to the number of days at about 37° C. The rate of change of released FFA concentration over the course of days at 37° C. may then be used to predict the change of released FFA concentration over the course of months at 5° C., as shown in Table 3 and Table 4. Using this method, and known limits to the solubility of FFAs after which point they may precipitate and form fatty acid particles, a shelf life of a pharmaceutical product may be predicted using simple and rapid measurements over the course of days It is understood that the present invention is not limited to any of the aforesaid formulation(s), pharmaceutical product(s), excipient(s), protein(s), antibody(s), cell(s), composition(s), polysorbate(s), free fatty acid(s), host cell protein(s), liquid chromatography system(s) or mass spectrometer(s), and any formulation(s), pharmaceutical product(s), excipient(s), protein(s), antibody(s), cell(s), composition(s), polysorbate(s), free fatty acid(s), host cell protein(s), liquid chromatography system(s) or mass spectrometer(s) can be selected by any suitable means.

The present invention will be more fully understood by reference to the following Examples. They should not, however, be construed as limiting the scope of the invention.

EXAMPLES

Materials

Formic acid, methanol (MeOH), isopropanol (IPA), and acetonitrile (ACN) were purchased from Thermo Fisher Scientific (Waltham, MA). Ammonium acetate, lauric acid, myristic acid, palmitic acid, oleic acid, stearic acid, linoleic acid, lauric-$d_{23}$ acid (CAS number 59154-43-7), myristic-$d_{27}$ acid (CAS number 60658-41-5), and oleic acid-$^{13}C_{18}$ (CAS number 287100-82-7) were purchased from Sigma-Aldrich (St. Louis, MO). Super-refined PS20 was purchased from Croda (East Yorkshire, UK). All mAbs were prepared at Regeneron Pharmaceuticals, Inc. An Oasis MAX column, Acquity UPLC BEH C4 column, and Acquity UPLC CSH C18 column were purchase from Waters (Milford, MA). Glass vials were purchased from Waters, and Eppendorf® LoBind microcentrifuge tubes were purchased from Sigma Aldrich (St. Louis, MO). Human liver carboxylesterase (CES-1) was purchased from Abcam (Cambridge UK).

mAb-1 is an antibody with detectable levels of lysosomal acid lipase (LAL) (<0.5 ppm). mAb-2, mAb-3 and mAb-6 are also antibodies with variable levels of LAL (<1 ppm). mAb-4 is an in-process sample of an antibody, and mAb-5 is the same antibody further purified. mAb-7 is an IgG4 antibody sample that did not meet particulate specifications after storage at 2° C.-8° C. for 6 months.

Optimization of Incubation Condition for PS20 Hydrolysis for Fatty Acid Quantitation The hydrolysis of PS20 in mAb formulations used for the fatty acid quantitation method of the invention was optimized by mixing 60 μL of 200 mg/mL mAb-3 (10 mM histidine, pH 6.3) with 0.62 μL, 1.26 μL, 3.2 μL and 6.8 μL 10% PS20 with or without 1.5 μL ISTD mixture (200 μg/mL lauric-$d_{23}$ acid, 40 μg/mL myristic-$d_{27}$ acid, and oleic acid-$^{13}C_{18}$ in 20% methanol) in Eppendorf plastic tubes (category number 022431064) or Waters glass vials (SKU 600000668CV), followed by incubation at 37° C. for 1 or 3 days. Incubation samples were analyzed by LC multiple reaction monitoring (LC-MRM) after extraction (Table 2).

TABLE 2

Optimization of incubation condition

| Test subject | Surfactant | Incubation with ISTD | Container | Extraction |
|---|---|---|---|---|
| 200 mg/mL mAb-3 | 0.1% PS20 | No | Plastic vial | 80% IPA/20% MeOH with ISTD |
| | | Yes | | 80% IPA/20% MeOH |
| | 0.2% PS20 | No | | 80% IPA/20% MeOH with ISTD |
| | | Yes | | 80% IPA/20% MeOH |
| | 0.5% PS20 | No | | 80% IPA/20% MeOH with ISTD |
| | | Yes | | 80% IPA/20% MeOH |
| | 1% PS20 | No | | 80% IPA/20% MeOH with ISTD |
| | | Yes | Glass Vial Plastic Vial | 80% IPA/20% MeOH |

FFA Extraction from Formulated mAb

Incubation conditions were optimized for measuring fatty acid content using LC-MRM after extraction. Fatty acids were extracted from mAb solution using an extraction protocol developed by Honemann et al. with an optimized precipitation buffer and extraction time (Honemann et al.). Lauric-$d_{23}$ acid, myristic-$d_{27}$ acid, and oleic acid-$^{13}C_{18}$ were diluted in 80% IPA/20% methanol to obtain a precipitation buffer with a final concentration of 1 μg/mL for each heavy isotope-labeled fatty acid. Next, 10 μL of formulated mAb was added to 90 μL of the extraction buffer. The sample was mixed by vortexing and maintained at room temperature (25° C.) for 2.5 hours. mAb was precipitated and spun down by centrifugation at 25° C. at 14,000 rcf for 30 minutes. Subsequently, 40 μL of the supernatant was transferred to a 96-well plate, and 5 μL was subjected to LC-MRM for quantitation. For mAbs incubated with ISTD, precipitation buffer was prepared by mixing 80% IPA and 20% MeOH without the addition of heavy isotope-labelled fatty acids, as illustrated in Table 2.

Figure 9A:
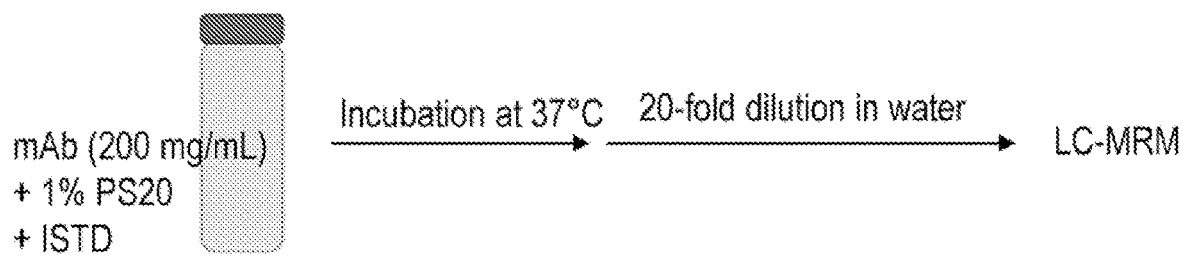
FIG. 9A illustrates a sample preparation procedure for PS20 degradation measurement according to an exemplary embodiment.

Hydrolysis of Polysorbate 20 in Formulated Antibody Prepared for Fatty Acid Quantitation The hydrolysis of PS20 in formulated mAb analyzed by fatty acid quantitation was examined by mixing 60 μL of 200 mg/mL mAb (10 mM histidine, pH 6.3 with 6.8 μL of 10% PS20) and 1.5 μL of ISTD mixture (200 μg/mL lauric-$d_{23}$ acid and 40 μg/mL myristic-$d_{27}$ acid in 20% MeOH) for a final concentration of 5 μg/mL lauric-$d_{23}$ acid and 1 μg/mL myristic-$d_{27}$ acid in Waters glass vials, followed by incubation at 37° C. for 1 or 3 days. One aliquot (4 μL) of each solution was diluted with water to a final volume of 80 µL before LC-MRM analysis, as shown in FIG. 9A.

LC-MRM Quantitation of FFAs

LC-MRM analysis was performed on an Agilent 6495 QQQ Mass Spectrometer (Agilent, Wilmington, DE) equipped with an Agilent 1290 Infinity ultra-HPLC (UHPLC) (Agilent, Wilmington, DE). For this step, 20 µL of the diluted sample was injected into an Acquity BEH C4 column (2.1×50 mm, 1.7 mm) at 40° C., with 20 mM ammonium acetate in water as mobile phase A and methanol as mobile phase B. After injection, the column was equilibrated at 35% mobile phase B for 0.5 minutes, linearly increased to 90% B over 4.5 minutes, held for 1.5 minutes, and then re-equilibrated at 35% mobile phase B for 2.9 minutes. Elution was performed at 0.4 mL/minute, and peaks at 1-7 minutes were analyzed using an ESI source operating in negative mode, with a gas temperature of 200° C., gas flow of 12 L/minute, nebulizer gas pressure of 20 psi, sheath gas temperature of 300° C., sheath gas flow of 11 L/min, capillary voltage of −3000 V, and nozzle voltage of 500 V. Lauric acid and lauric-$d_{23}$ acid were monitored at 199.1/199.1 and 222.3/222.3; myristic acid and myristic-$d_{27}$ acid were monitored at 227.2/227.2 and 254.4/254.4; palmitic acid, oleic acid, oleic acid-$^{13}C_{18}$, stearic acid, and linoleic acid were monitored at 255.2/255.2, 281.2/281.2, 299.2/299.2, 283.2/283.2, and 279.2/279.2 with CE 5, respectively. Next, 10 µg/mL spiked-in fatty acid stock solution was prepared by adding 20 µL of fatty acid mixture (0.5 mg/mL mixtures of lauric acid, myristic acid, palmitic acid, oleic acid, stearic acid, and linoleic acid in methanol) to 1 mL of 10 mg/mL mAb-5 mixed with 5 µg/mL lauric-$d_{23}$ acid, 1 µg/mL myristic-$d_{27}$ acid, and 1 µg/mL oleic acid-$^{13}C_{18}$. Twelve calibration standards were prepared by a series of 1:1 dilutions by mixing fatty acid stock solution with 10 mg/mL mAb-5 (with 5 µg/mL lauric-$d_{23}$ acid, 1 µg/mL myristic-$d_{27}$ acid, and 1 µg/mL oleic acid-$^{13}C_{18}$). Peak integration was performed by Skyline, and fatty acid concentrations were calculated based on a calibration curve created from a spiked-in fatty acid concentration plot against $$\frac{\text{Peak area of } FFA}{\text{Peak area of } ISTD}.$$

Hydrolysis of PS20 in Formulated Antibody Prepared for 2D-CAD Measurement

The hydrolysis of PS20 in formulated mAb was analyzed via two-dimensional liquid chromatography-charged aerosol detection (2D-LC-CAD) by mixing 27 µL of 200 mg/mL mAb (10 mM histidine, pH 6.3 with 3 µL of 0.5% PS20) followed by incubation at 37° C. for 12 or 28 days. One aliquot (6 µL) of each solution was diluted by adding 69 µL 10 mM histidine, pH 6.0 before the LC-CAD analysis.

2D-LC-CAD to Analyze PS Degradation

Figure 2A:
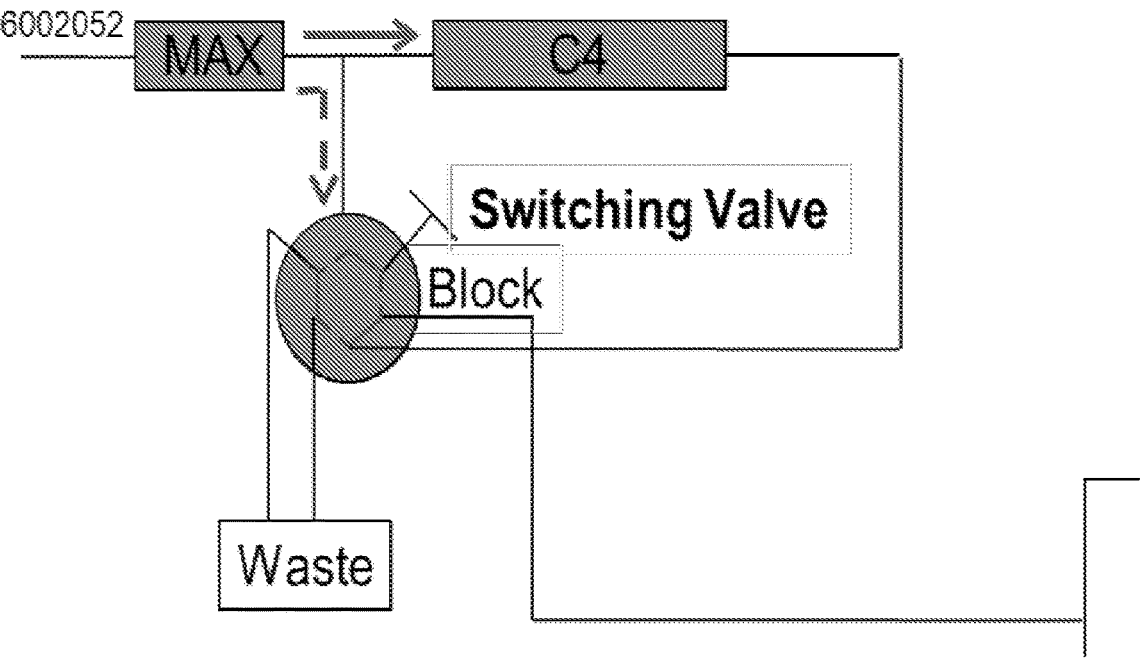
FIG. 2A illustrates an LC-MS and liquid chromatography-charged aerosol detection (LC-CAD) assay for polysorbate analysis according to an exemplary embodiment.

PS20 degradation in CHO cell-free media or formulated antibody were analyzed by a 2D-HPLC-CAD system, as shown in FIG. 2A. The details of the setup were previously described by Borisov et al. PSs were separated from formulated mAb by an Oasis MAX column (2.1×20 mm, 30 mm), with the initial gradient held at 99% solvent A (0.1% formic acid in water) and 1% solvent B (0.1% formic acid in acetonitrile) for 1 minute. The gradient was then increased to 20% solvent B over 1.5 minutes and decreased to 1% over another 1.5 minutes. The increasing and decreasing gradient cycle for solvent B was repeated three times over 10 minutes to ensure complete removal of mAb from the PSs. Via a switch valve, the PSs were then subjected to separation by reversed phase chromatography using an Acquity BEH C4 column (2.1×50 mm, 1.7 mm). During the separation, solvent B was increased from 1% to 20% over 1.5 minutes at the end of the 10-minute gradient cycle; solvent B was then gradually increased to 99% at 45 minutes and held for 5 minutes, followed by an equilibration step of 1% B for 5 minutes. The flow rate was maintained at 0.1 mL/minute, with a column temperature of 40° C.

Figure 2B:
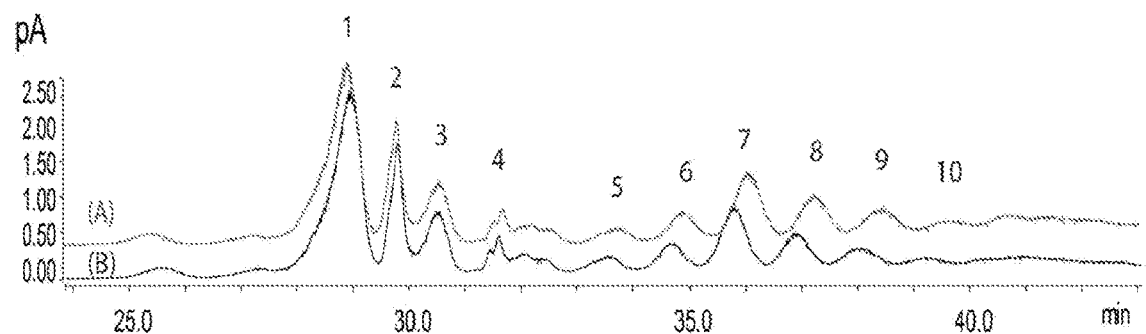
FIG. 2B shows CAD chromatography of PS20 standard (A) and PS20 in mAb formulation (B) separated and detected by 2D-LC-CAD according to an exemplary embodiment. The labeled peaks are POE sorbitan monolaurate (1), POE isosorbide monolaurate (2), POE sorbitan monomyristate (3), POE isosorbide monomyristate (4), POE isosorbide monopalmitate (5), POE isosorbide monosterate (6), POE sorbitan mixed diesters (7-9), POE sorbitan trilaurate, and POE sorbitan tetralaurate (10).
Figure 2C:
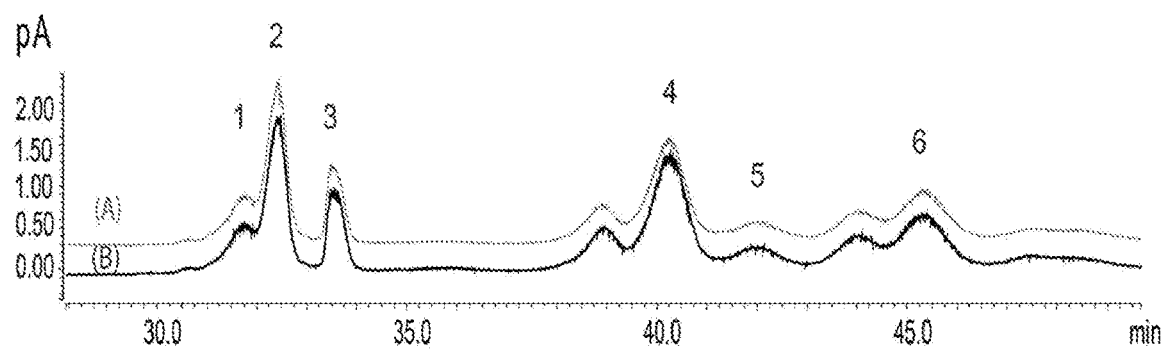
FIG. 2C shows CAD chromatography of PS80 standard (A) and PS20 in mAb formulation (B) separated and detected by 2D-LC-CAD according to an exemplary embodiment. The labeled peaks are POE sorbitan monolinoleate (1), POE isosorbide monooleate (2), POE sorbitan monooleate and POE monooleate(3), POE sorbitan di-oleate (4), POE isosorbide di-oleate and POE di-oleate (5), and POE sorbitan mixed trioleate and tetraoleate (6).
Figure 2D:
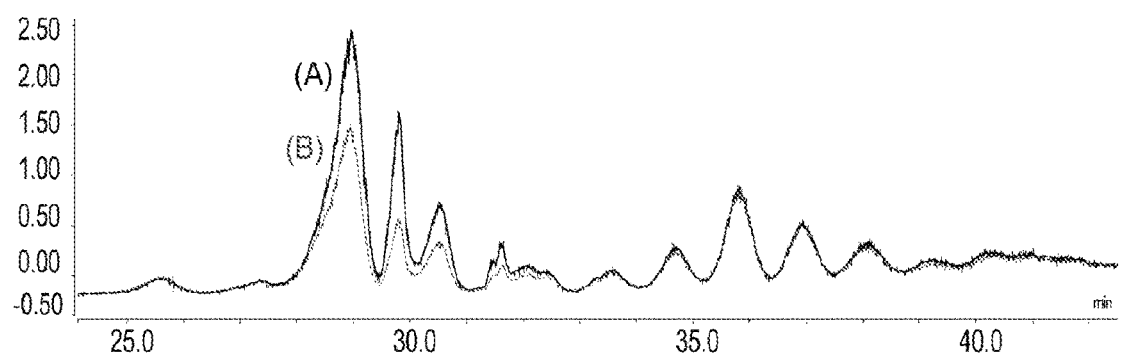
FIG. 2D shows a chromatogram of 0.1% PS20 in 75 mg/mL mAb-7 incubated at 37° C. in 10 mM histidine, pH 6.0 for 0 days (A, T0) and 5 days (B, T5) according to an exemplary embodiment.

A 2D-LC system was set up with a Thermo UltiMate 3000 coupled with a Corona Ultra CAD detector operating under a nitrogen pressure of 75 psi for quantitation. Chromeleon 10 software was used for system control and data analysis. The peak area for each ester was separated and integrated from the CAD chromatogram, and the areas were summed to account for the total intact ester in PS20, as shown in FIGS. 2B and 2C. The remaining percentage of PS20 used in this work was calculated by comparing the sum of the peak areas of POE esters at each time point to the sum of peak areas at time zero $$\frac{\sum \text{Peak area (25 − 40 min) at } Tx}{\sum \text{Peak area (25 − 40 min) at } T0},$$

as shown in FIG. 2D.

Example 1. Optimization of Percentage Added for Incubation

Figure 3A:
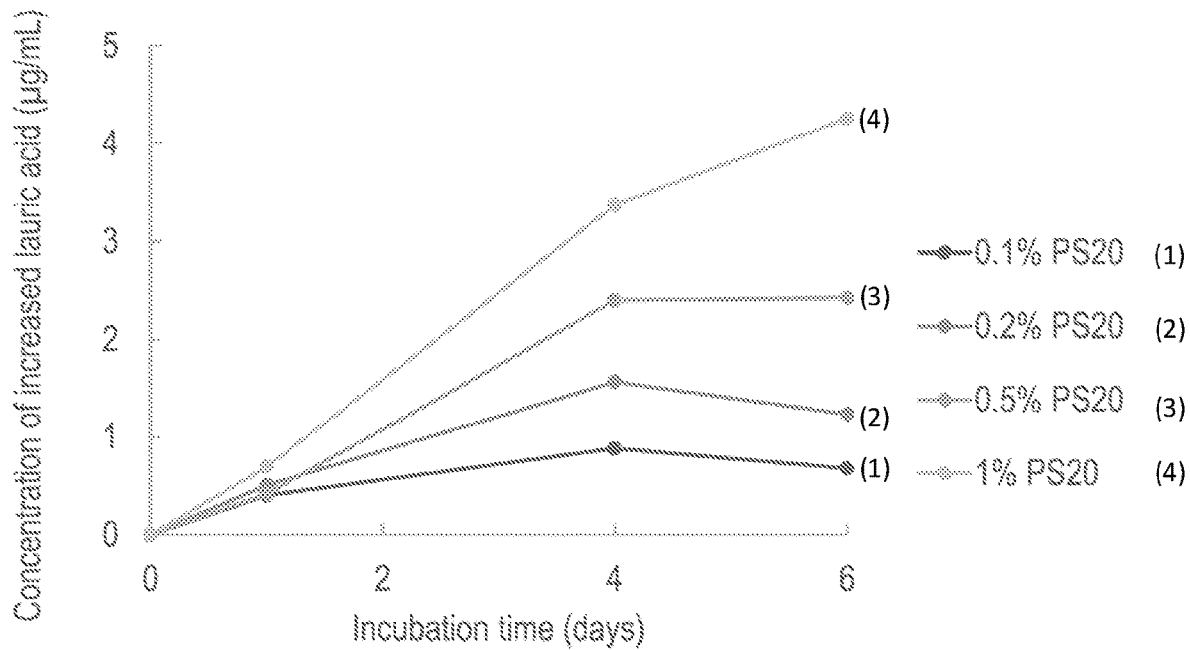
FIG. 3A shows a change in lauric acid concentration over time in a 200 mg/mL mAb-3 formulation according to an exemplary embodiment.
Figure 4:
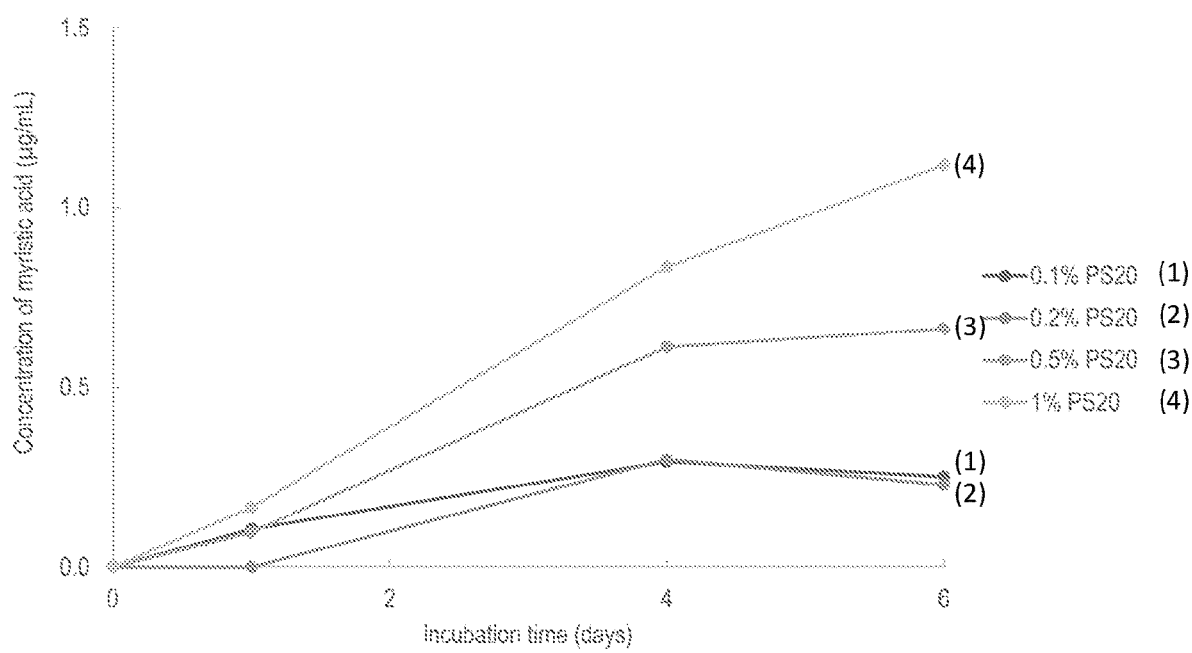
FIG. 4 shows a change in myristic acid concentration over time in a 200 mg/mL mAb-3 formulation according to an exemplary embodiment.

The incubation conditions were optimized by varying different parameters to achieve the highest rate of PS degradation. The impact of PS20% was determined by adding different percentages of PS (0.1%, 0.2%, 0.5%, and 1%) to 200 mg/mL mAb-3 solution in Eppendorf LoBind microcentrifuge tubes, which were then incubated at 37° C. for 1, 4, or 6 days. The PS20% was maintained at 1% or lower to avoid potential ion suppression of the MS signal and further dilution of the mAb. Samples from each time point were extracted and subjected to LC-MRM-MS to quantify the released FFA. As shown in FIG. 3A, the level of lauric acid increased much faster under incubation with 1% PS20 compared with 0.1%, 0.2%, and 0.5% PS20. Similarly, myristic acid levels also showed the most rapid increase in 1% PS20, as shown in FIG. 4. Interestingly, the increase in the released FFAs stopped or slowed after 4 days of incubation, despite the fact that the concentration of lauric acid after 4 days of incubation was less than 5 µg/mL, which is much lower than its solubility in the formulation (>20 µg/mL). This finding suggests that the released fatty acid was lost during incubation, despite the continuous hydrolysis of PS20.

Figure 3B:
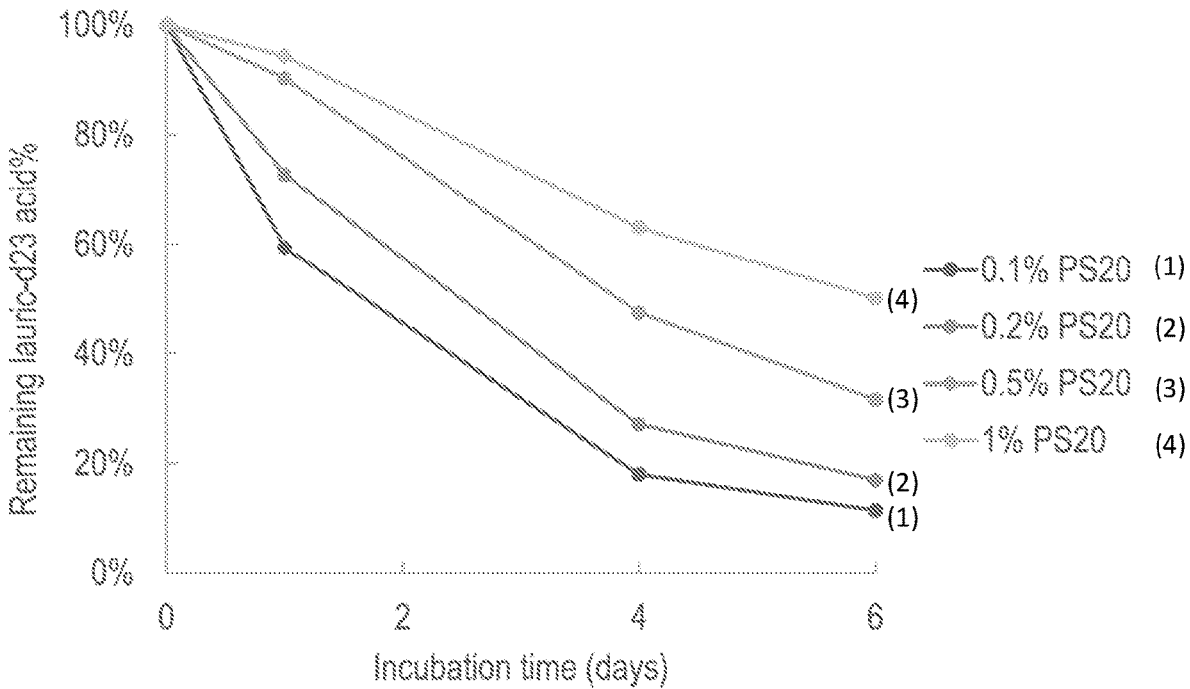
FIG. 3B shows a percent loss of lauric-$d_{23}$ acid over time according to an exemplary embodiment.
Figure 5A:
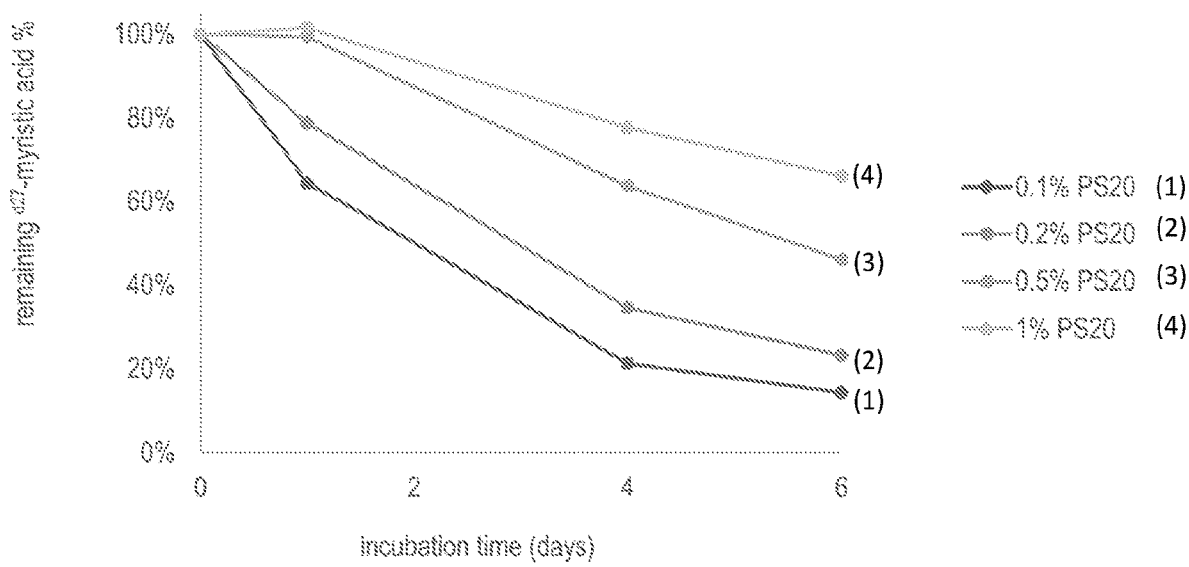
FIG. 5A shows a percent loss of myristic-$d_{27}$ acid over time according to an exemplary embodiment.
Figure 5B:
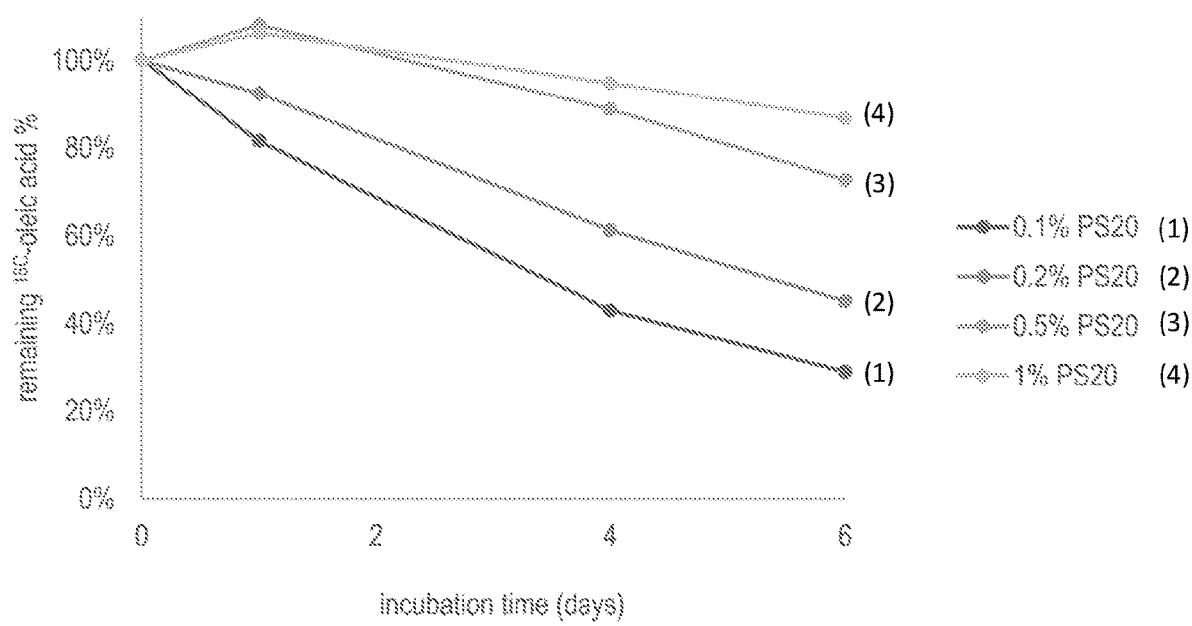
FIG. 5B shows a percent loss of oleic acid-$^{13}C_{18}$ over time according to an exemplary embodiment.

To investigate why fatty acids were lost during incubation, isotope-labeled fatty acids were employed. Various percentages of PS20 (0.1%, 0.2%, 0.5% and 1%) were incubated with 200 mg/mL mAb3 containing 5 µg/mL lauric acid-$d_{23}$, 1 µg/mL myristic-$d_{27}$ acid, and 1 µg/mL oleic acid-$^{13}C_{18}$, followed by fatty acid extraction and quantitation. A continuous loss was observed for all three heavy-isotope-labeled fatty acids. As shown in FIG. 3B, the addition of 1% PS20 is five-fold more effective in preventing the loss of lauric acid than 0.1% PS20 at day 6, which explains why lauric acid levels continued to increase at day 6 under incubation with 1% PS20. The lauric acid level stopped increasing or even decreased at day 6 when incubated with 0.5%, 0.2%, or 0.1% PS20. The same loss trends were observed for heavy-isotope-labeled myristic acid and oleic acid, as shown in FIGS. 5A and 5B. The loss of fatty acids slowed as the carbon chain length of the fatty acids increased. Only 15% of oleic acid was lost after a 6-day incubation with 1% PS20, compared with 50% of lauric acid and 34% of myristic acid.

Example 2. Optimization of Incubation Container

Figure 6B:
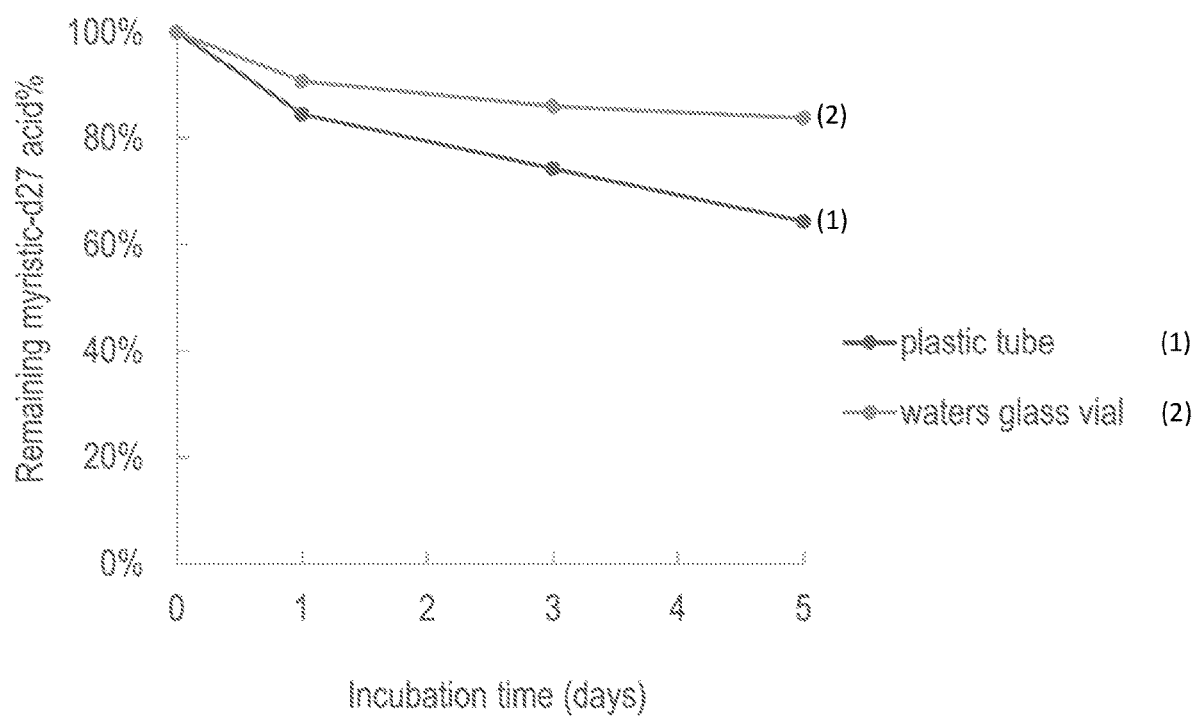
FIG. 6B shows a percent loss of myristic-$d_{27}$ acid over time in a plastic tube (1) or a glass vial (2) according to an exemplary embodiment.
Figure 7A:
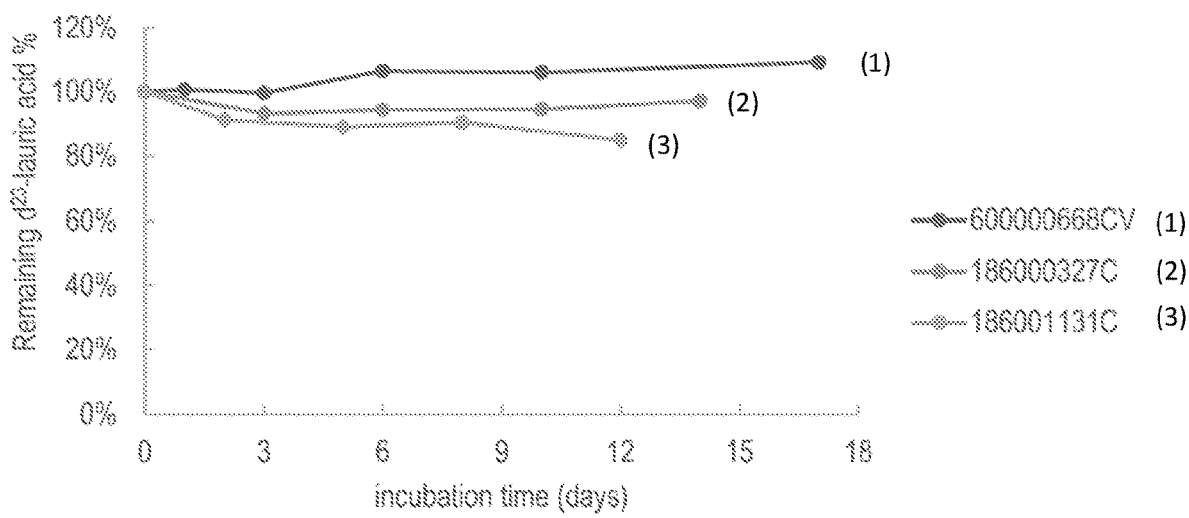
FIG. 7A shows the recovery of lauric-$d_{23}$ acid over 2 weeks using different waters glass vials, according to an exemplary embodiment.
Figure 7B:
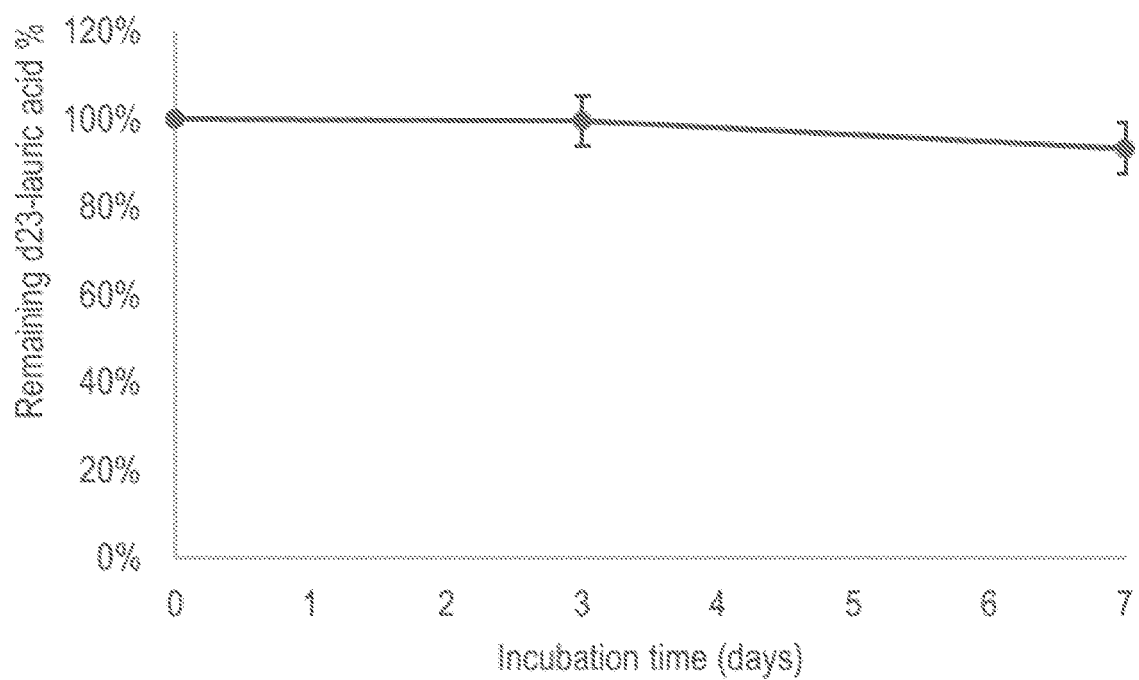
FIG. 7B shows the recovery of lauric-$d_{23}$ acid of 8 mAbs over 7 days of incubation in Waters glass vial 186000327C, according to an exemplary embodiment.

The finding that higher percentages of PS20 can slow the loss of fatty acids suggests that fatty acid loss may result from adsorption on the incubation container. A recent study by Yao et. al indicated that plastics cause inaccurate quantitation of palmitate in metabolomics studies (Yao et al., *Metabolomics* 12 (2016)). To assess the effect of the container on fatty acid quantitation, 200 mg/mL mAb-3 containing 5 µg/mL lauric-$d_{23}$ acid, 1 µg/mL myristic-$d_{27}$ acid, and 1 µg/mL oleic acid-$^{13}C_{18}$ with 1% PS20 was incubated at 37° C. for 1, 3, or 5 days in Eppendorf LoBind plastic tubes and Waters glass vials (SKU.186000327C). The fatty acid contents were extracted, and quantitative results are shown in FIG. 6A for lauric acid and FIG. 6B for myristic acid. The loss of heavy-isotope-labeled fatty acids was significantly reduced when the Eppendorf LoBind plastic tubes were replaced with Waters glass vials. Therefore, glass vials are preferred for incubation in this fatty acid quantitation method of the invention. It should be noted that fatty acid loss still occurs in glass vials, although at greatly reduced levels, as shown in FIGS. 7A and 7B. Further optimization is still necessary to fully eliminate the adsorptive effects of the container.

Example 3. Incubation with ISTD: Heavy-Isotope-Labeled Fatty Acids

Figure 8A:
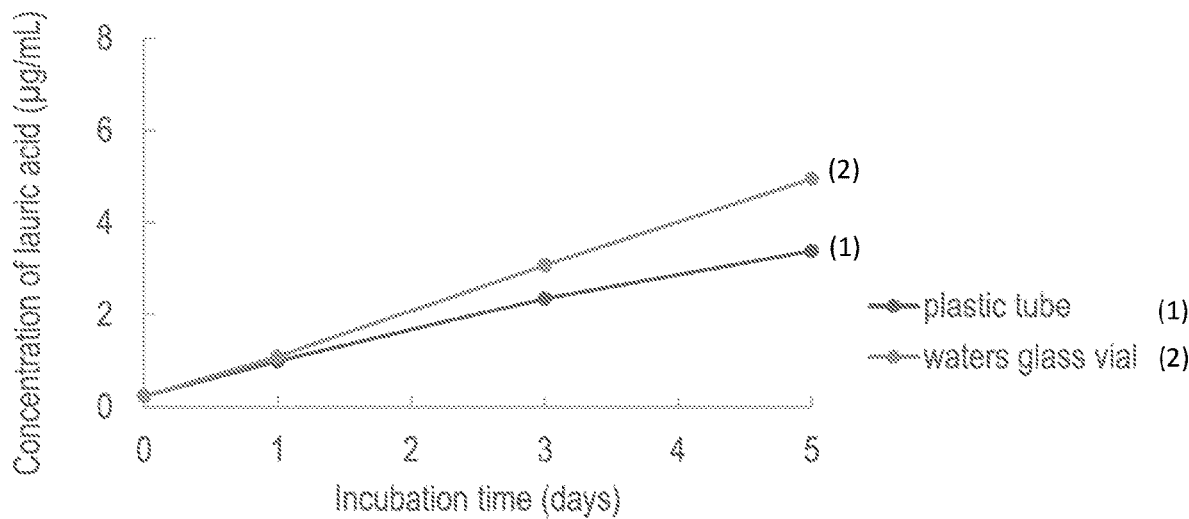
FIG. 8A shows a change in lauric acid concentration over time in a plastic tube (1) or a glass vial (2), without lauric-$d_{23}$ acid correction, according to an exemplary embodiment.
Figure 8B:
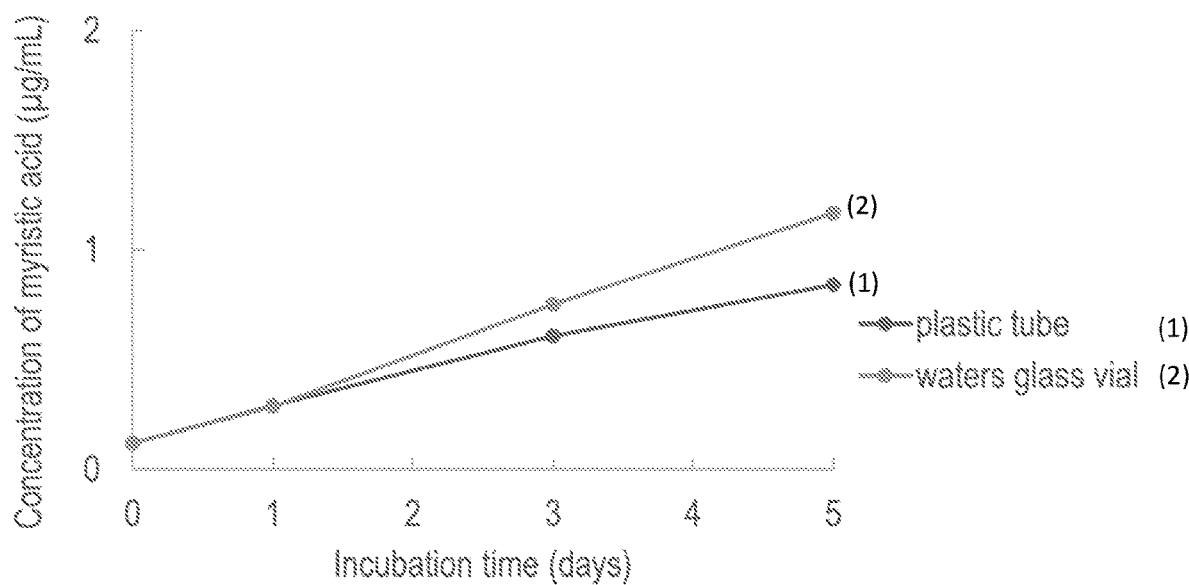
FIG. 8B shows a change in myristic acid concentration over time in a plastic tube (1) or a glass vial (2), without myristic-$d_{27}$ acid correction, according to an exemplary embodiment.
Figure 8C:
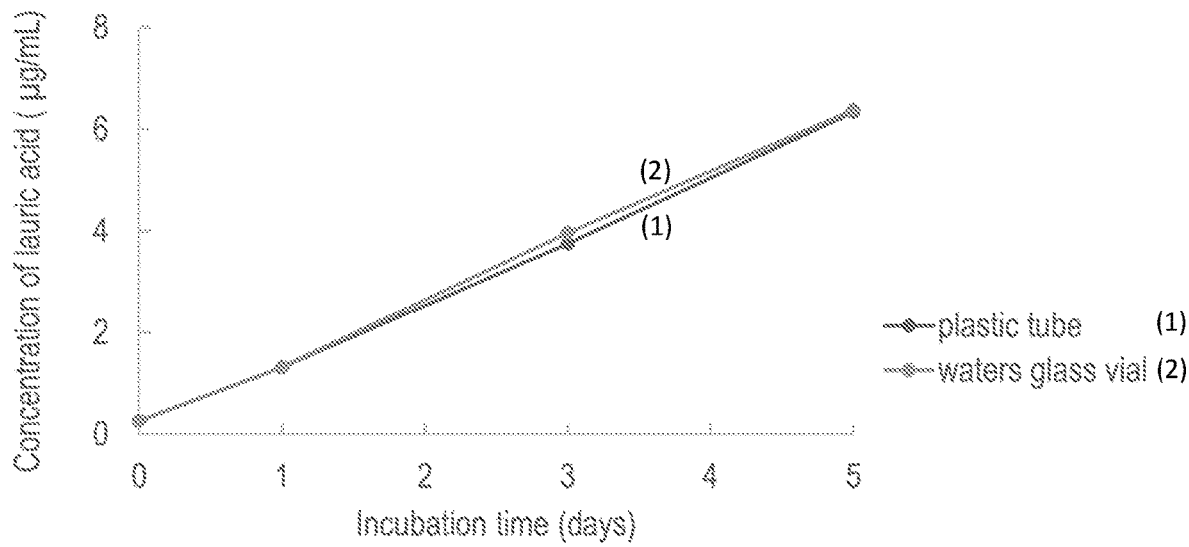
FIG. 8C shows a change in lauric acid concentration over time in a plastic tube (1) or a glass vial (2), with lauric-$d_{23}$ acid correction, according to an exemplary embodiment.
Figure 8D:
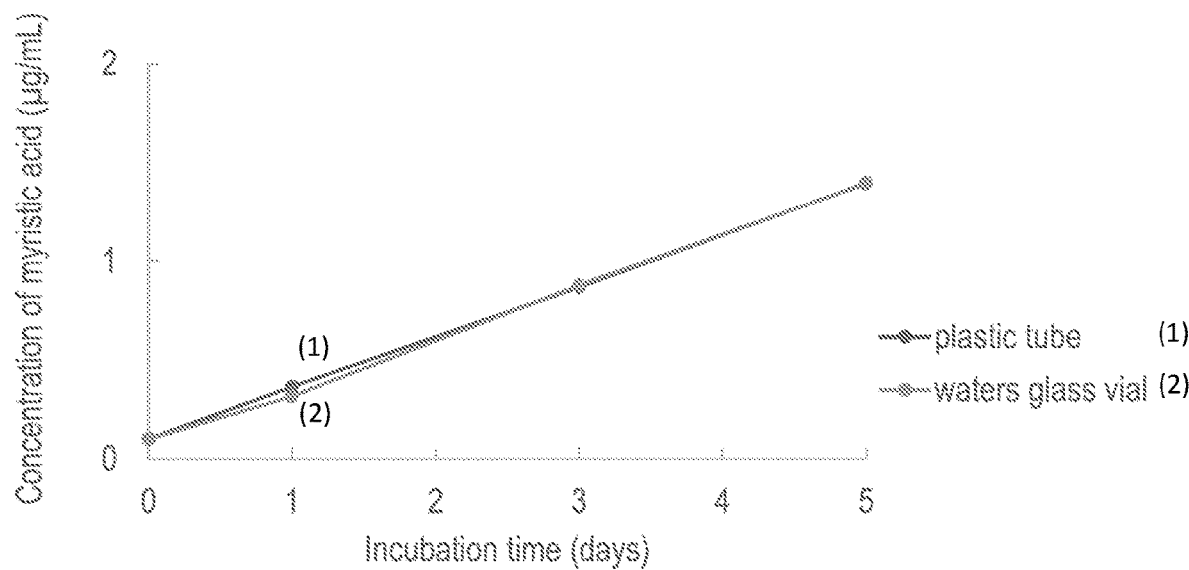
FIG. 8D shows a change in myristic acid concentration over time in a plastic tube (1) or a glass vial (2), with myristic-$d_{27}$ acid correction, according to an exemplary embodiment.

Typically, an ISTD is added after incubation and before LC-MRM-MS analysis so that the targeted fatty acids can be accurately calculated. Because of the finding described above that adsorptive losses occur during incubation, heavy-isotope-labeled fatty acids were instead added before incubation to account for the impact of the fatty acid adsorptive loss, as both heavy and light fatty acids will decrease at the same rate during incubation. mAb3 (200 mg/mL) containing 5 µg/mL lauric-$d_{23}$ acid, 1 µg/mL myristic-$d_{27}$ acid, and 1 µg/mL oleic acid-$^{13}C_{18}$ was incubated with 1% PS20 at 37° C. for 1, 3, or 5 days in Eppendorf LoBind plastic tubes and Waters glass vials. The quantitation results calculated from the peak FFA area without correction by the ISTD are shown in FIGS. 8A and 8B. The measured FFAs showed different values in the glass and plastic vials, with the glass vials showing a notably higher value. After correction by the ISTD, the lauric and myristic acid levels were determined to be the same for both containers, indicating that the novel approach of adding an ISTD prior to the incubation step successfully eliminated the container effects, as shown in FIGS. 8C and 8D. In addition, both lauric and myristic acid levels were higher after ISTD correction than those without correction, suggesting more accurate quantitation using the method of the present invention.

Figure 9B:
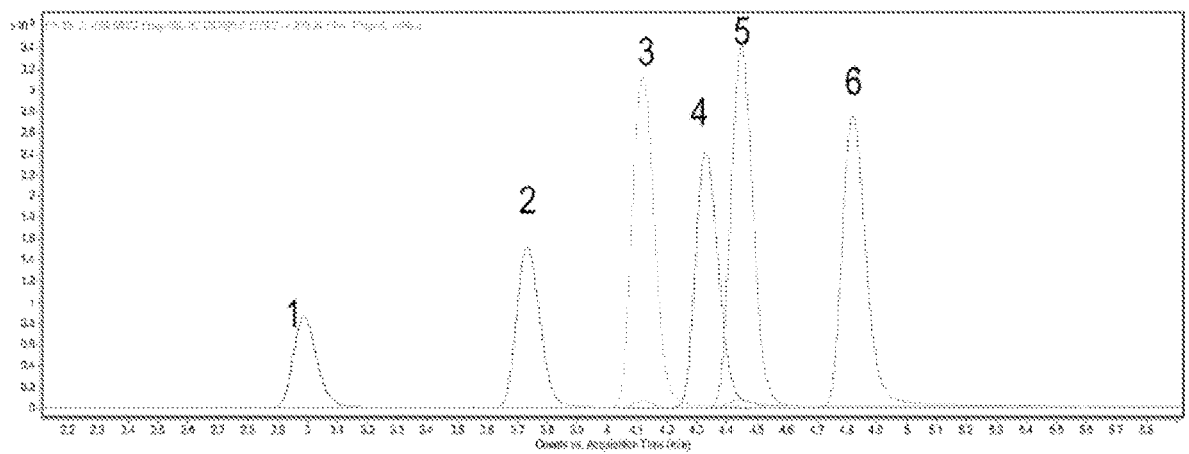
FIG. 9B shows multiple reaction monitoring (MRM) and retention times of FFAs according to an exemplary embodiment. The labeled peaks are lauric acid C12 (1), myristic acid C14 (2), linoleic acid C18:2 (3), palmitic acid C16 (4), oleic acid C18:1 (5), and stearic acid C18:0 (6).
Figure 9C:
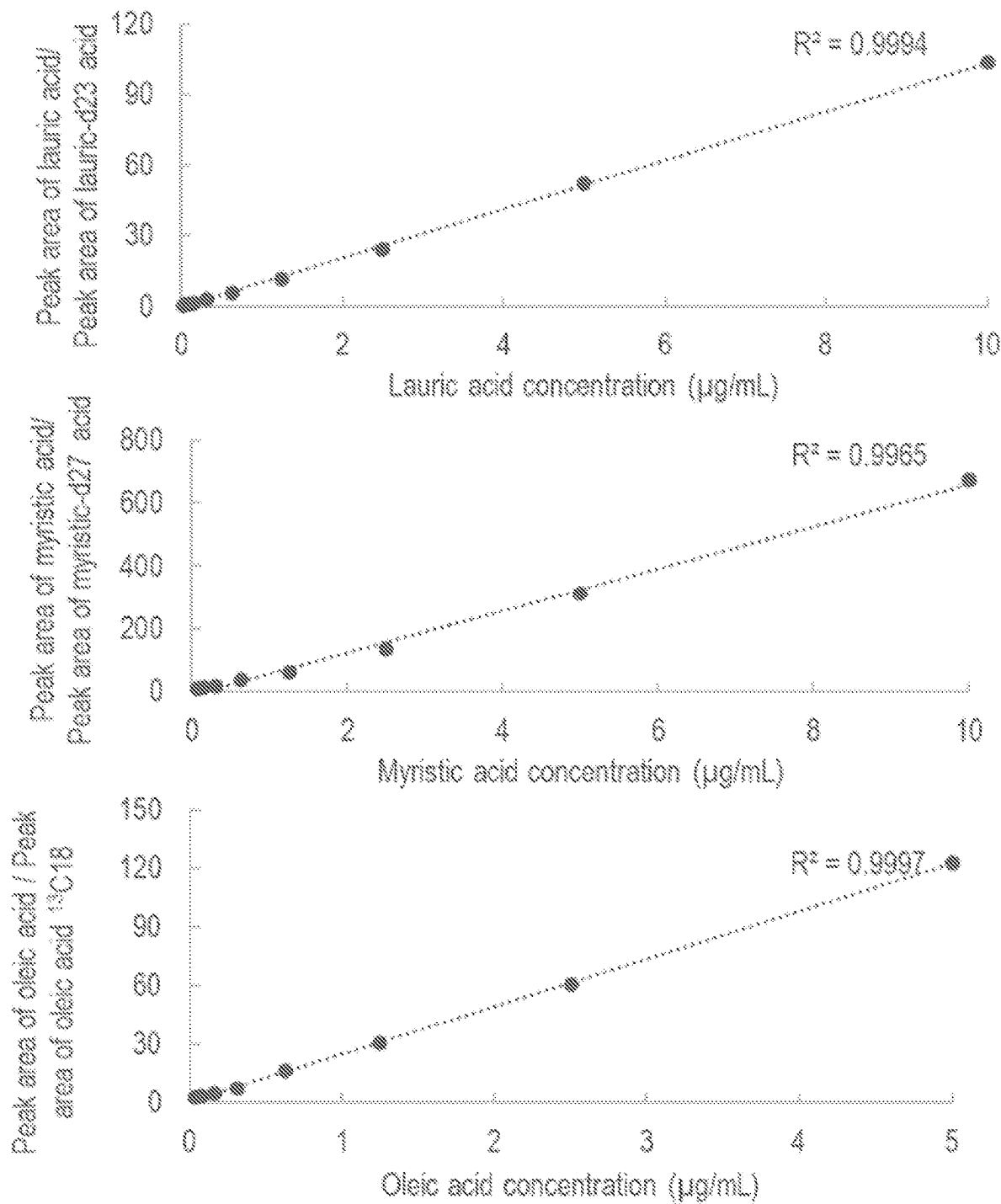
FIG. 9C shows a calibration curve of lauric acid, myristic acid and oleic acid in 10 mg/mL mAb-5 according to an exemplary embodiment.

Example 4. Extraction-Free Quantitation of Fatty Acids in Pharmaceutical Formulations Using LC-MRM-MS All previous methods for quantitation of individual FFAs in pharmaceutical formulations include extraction, as this step can greatly simplify the sample composition prior to LC-MRM-MS analysis. However, any additional sample-processing step can introduce variation in quantitation and the need for increased time and effort, therefore compromising the goal of high-throughput analysis. If the extraction step can be avoided, the efficiency of FFA quantitation can be significantly improved. In fatty acid quantitation for PS degradation, the sample composition is quite simple, with only three major components: PS, FFA, and recombinant protein, for example mAb. Direct injection is possible if the three components can be separated chromatographically. To ensure the separation of FFAs from mAb and to avoid column blockage by mAb, a C4 column was selected. As a proof of principle, FFA standards were spiked in 10 mg/mL mAb-5 (equal to the final mAb concentration for FFA quantitation without extraction [20-fold dilution of 200 mg/mL mAb]) and sample was directly injected into the LC-MS for fatty acid detection. As shown in FIG. 9B, the method allows baseline separation of a mixture of multiple FFAs (lauric acid, myristic acid and palmitic acid), which are typically formed after PS20 degradation. Palmitic acid, linoleic acid, and oleic acid, which are degradants formed after PS80 degradation, were partially overlapped in the TIC but can be well separated in a different m/z channel. FIG. 9C demonstrates that high specificity and linearity can be achieved for major PS20 and PS80 FFA degradants (lauric acid, myristic acid, and oleic acid) spiked in mAb-5 over a concentration range of 19 ng/mL to 10 µg/mL, with linear regression $R^2>0.999$. The detection limit of lauric acid, myristic acid, and oleic acid were determined to be 22, 680, and 211 ngl/mL, respectively. The low detection limit of lauric acid and oleic acid allows subtle changes of PS20 and PS80 to be monitored. When 0.02% PS20 was degraded, a 17.81 µg/mL lauric acid increase was observed, which means that this method can monitor a change of PS20 as low as 0.000024%. For PS80, a 33.25 µg/mL oleic acid increase with 0.025% of PS80 degraded was observed, indicating that 0.00016% PS80 decrease can be detected.

Figure 9D:
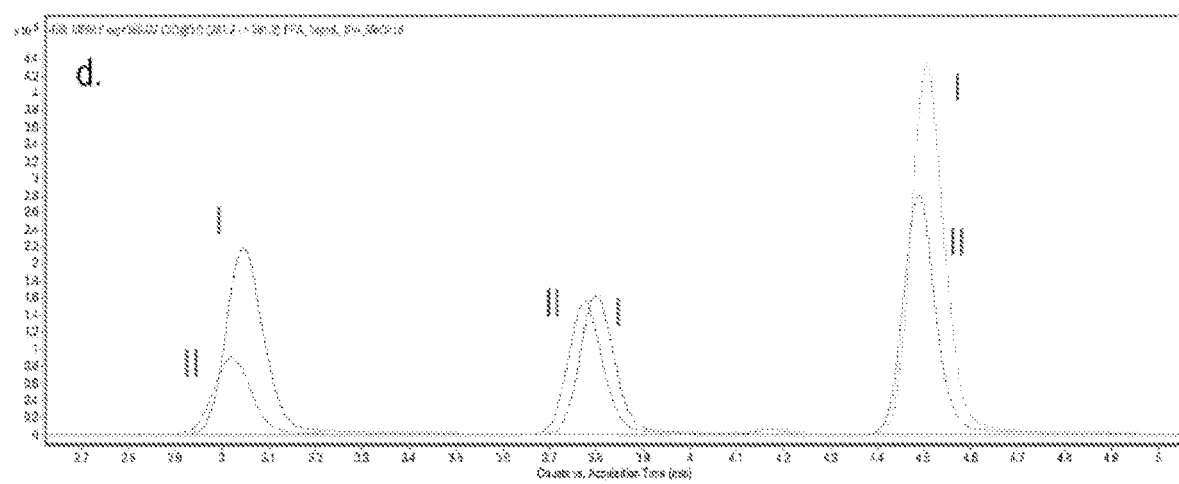
FIG. 9D shows a comparison of a mixture of 1 μg/mL lauric acid, myristic acid and oleic acid spiked in 10 mg/mL mAb-5 with a 20 μL injection volume (I) or 80%/20% isopropanol/methanol (IPA/MeOH) with a 5 μL injection volume (II) according to an exemplary embodiment.
Figure 10:
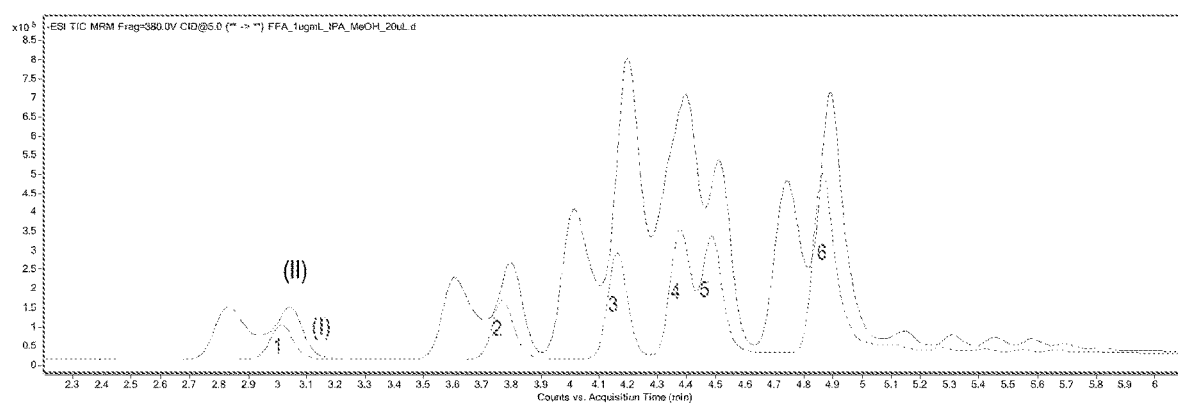
FIG. 10 shows a summed total ion current (TIC) chromatogram of a spiked FFA mixture in IPA/MeOH containing the most prevalent fatty acids from PS20 and PS80, according to an exemplary embodiment. The labeled peaks are lauric acid C12 (1), myristic acid C14 (2), linoleic acid C18:2 (3), palmitic acid C16 (4), oleic acid C18:1 (5), and stearic acid C18:0 (6). Trace I is an injection of a 5 μL mixture of spiked free fatty acids in IPA/MeOH. Trace II is an injection of a 20 μL mixture of free fatty acids in IPA/MeOH.

To evaluate the impact of the mAb matrix on fatty acid quantitation, which is key for enabling the quantitation of FFAs with minimal sample preparation, three representative fatty acid standards (lauric acid, myristic acid and oleic acid) were spiked into 10 mg/mL mAb-5 and 80% IPA/20% methanol. Aqueous solution allows a higher injection volume (20 µL) in reversed phase chromatography compared with organic solution. As shown in FIG. 10, the injection of more than 5 µL FFAs in IPA/MeOH resulted in peak splitting. Therefore, 20 µL fatty acid in 10 mg/mL mAb-5 and 5 µL fatty acid in 80% IPA/20% methanol was injected into reversed phase LC in order to compare the peak FFA areas. The sensitivity of this approach was not compromised by the mAb matrix, as shown in FIG. 9D. The recovery of lauric acid and oleic acid was higher in the mAb matrix than in the IPA/MeOH solution, whereas the recovery of myristic acid was comparable in the mAb matrix and IPA/MeOH solution.

Figure 9E:
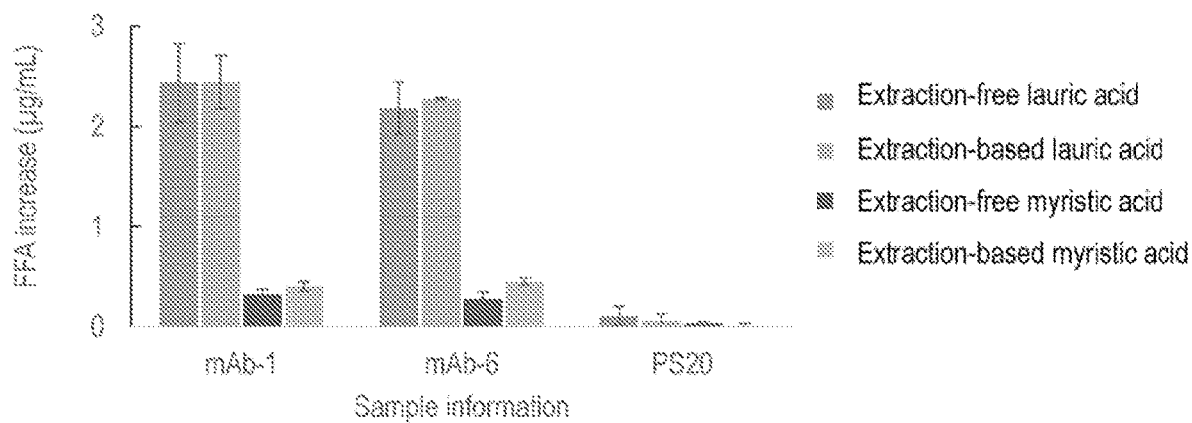
FIG. 9E shows quantitation of free fatty acid content with or without extraction for mAb-1, mAb-6 and PS20 with 3 day incubation according to an exemplary embodiment.

The accuracy of FFA quantitation using an approach with or without extraction was evaluated for two mAbs with an active lipase (LAL) at a concentration below 0.5 ppm, as shown in FIG. 9E. mAb-1 is an antibody with a low lipase activity level. After an 18-month incubation at 2° C.-8° C., 0.02% PS20 degradation was observed for this formulated antibody. mAb-6 is an antibody with a LAL concentration comparable to that of mAb-1. Both mAbs were incubated with 1% PS20 for 3 days before being subjected to LC-MRM-MS analysis. The accuracy of FFA quantitation by the extraction-free method was not impacted by the mAb matrix when compared with the extraction-based method, with both methods showing comparable results. The % RSD was below 15% for both methods. This result demonstrates that the method of the present invention can measure FFA release with the same accuracy as conventional methods without the additional complexity of an extraction step. FIG. 9E also shows the quantification of FFAs for a negative control (PS20 only without mAb or lipase), clearly demonstrating that the differences between the amount of fatty acids measured in a sample comprising a mAb with lipase activity and the negative control are much higher than the variation in measurement.

Figure 11A:
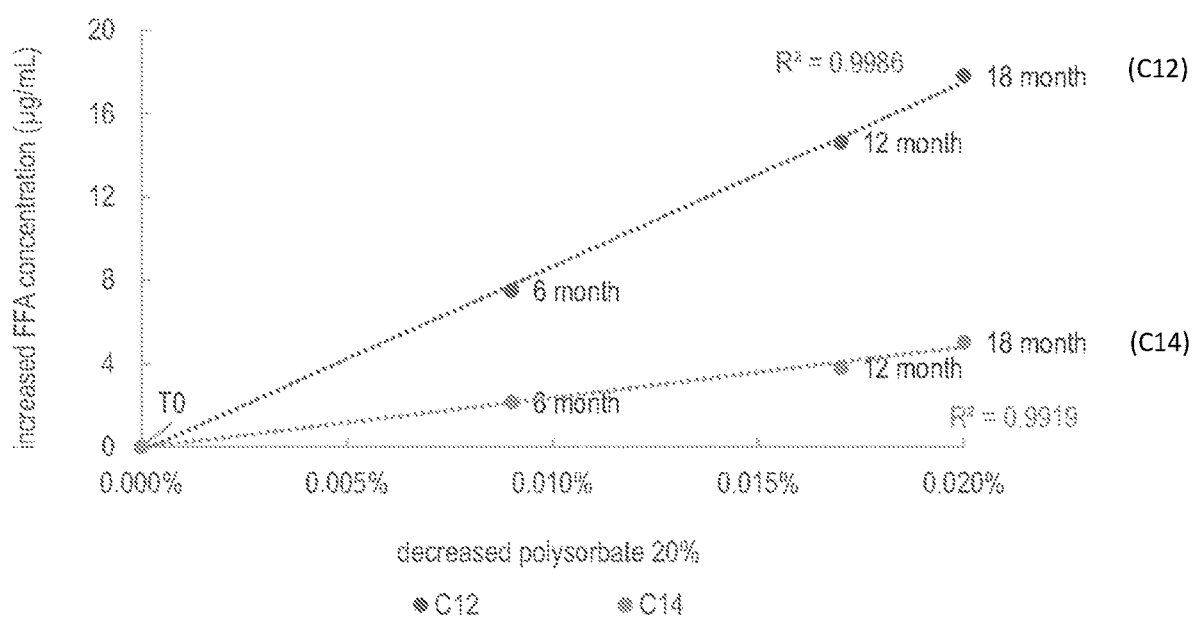
FIG. 11A shows a quantitation of FFA concentration for lauric acid (C12) and myristic acid (C14) correlated with decreased percentage of PS20, according to an exemplary embodiment. PS20 and FFA contents were measured over time in an mAb-1 formulation stored at 2° C.-8° C.
Figure 11B:
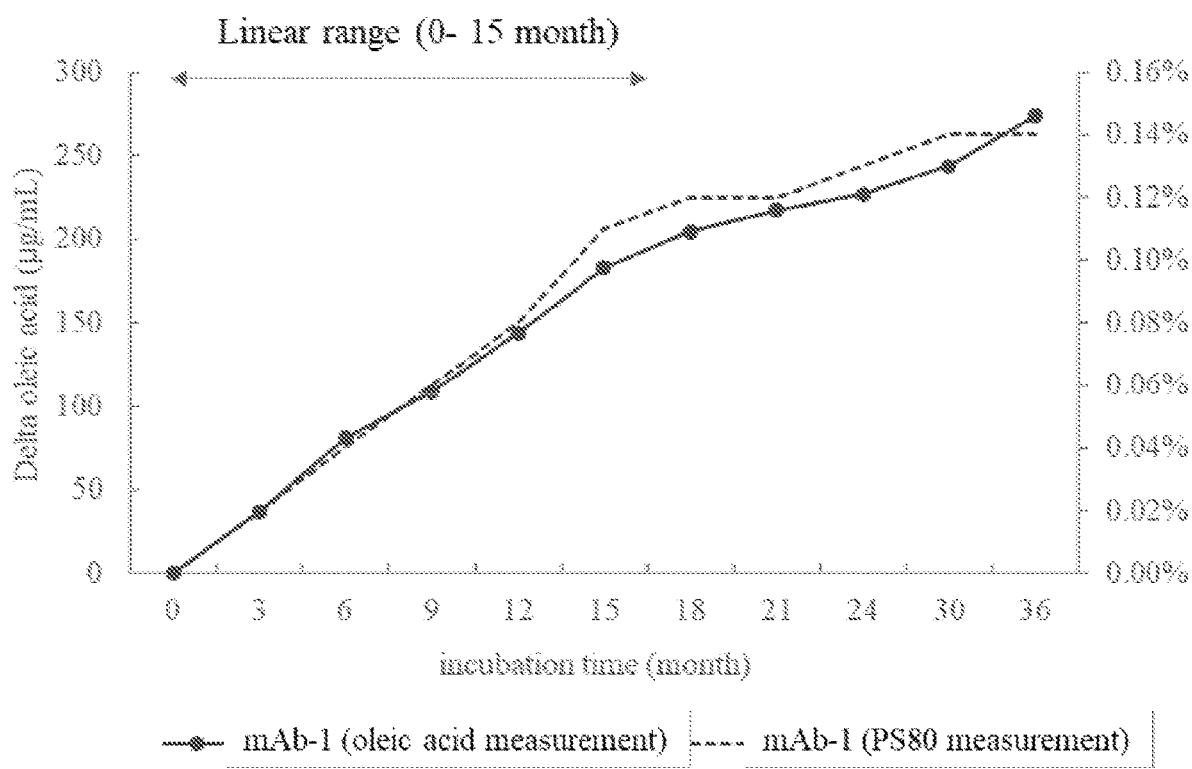
FIG. 11B shows PS80 degradation in mAb-1 at 5° C. over 36 months, as quantitated by released oleic acid during incubation (solid line) and PS80 species measured using LC-CAD (dashed line), according to an exemplary embodiment.
Figure 11C:
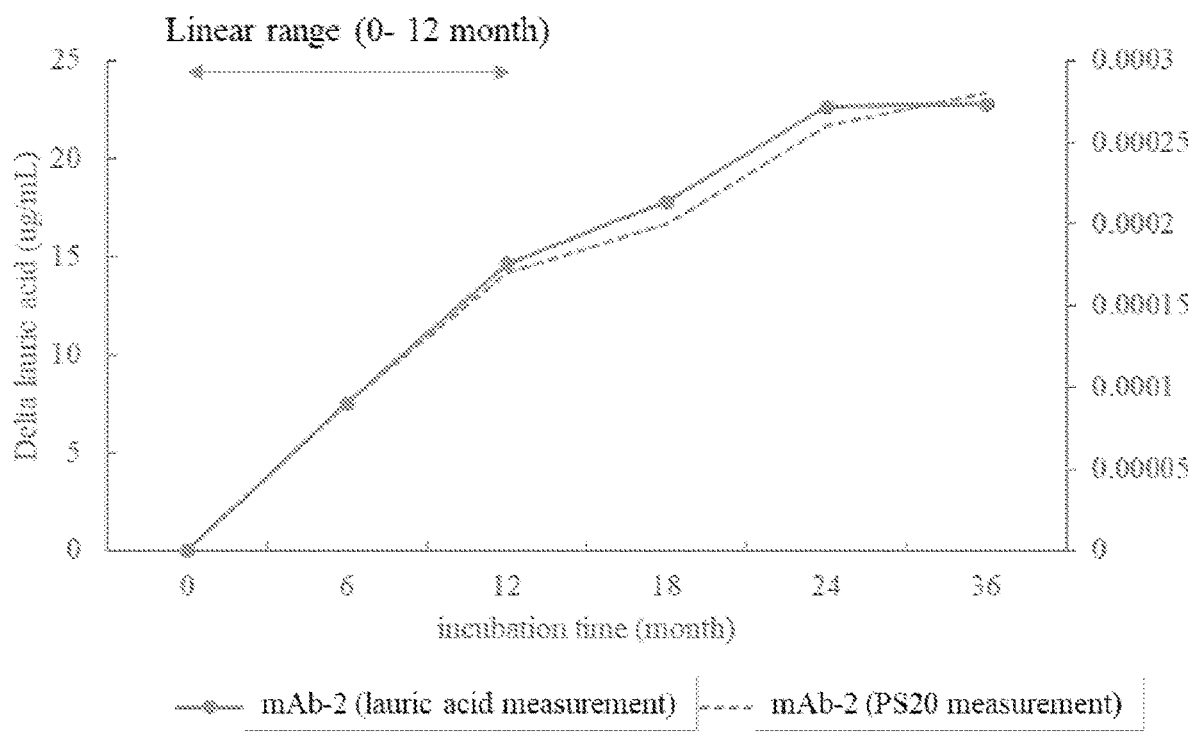
FIG. 11C shows PS20 degradation in mAb-2 at 5° C. in 36 months, as quantitated by released lauric acid during incubation (solid line) and PS20 species measured using LC-CAD (dashed line), according to an exemplary embodiment.

Example 5. Validation of the Correlation Between Fatty Acid Formation and PS Degradation Although it is well understood that FFA formation is positively related to PS degradation, there has been a lack of direct comparison between indirect measurements of PS degradation using fatty acid quantitation and direct measurements of PS degradation. Herein, the increased concentration of the released FFAs and the decreased percentage of PS20 were compared after incubation of an antibody (mAb-1) undergoing stability testing. mAb-1 was incubated at 2° C.-8° C. for 6, 12 and up to 18 months. Both FFA content and PS20 contents were measured at each time point, and these two numbers were highly correlated, with a correlation coefficient exceeding 0.99, as shown in FIG. 11A. Measurement of lauric acid is shown in line C12, and measurement of myristic acid is shown in line C14. Furthermore, when investigating PS80 degradation in mAb-1 at 5° C. over 36 months, released oleic acid correlated with PS80 species measured using LC-CAD, as shown in FIG. 11B; released oleic acid and PS80 degradation increased linearly for approximately the first 15 months, after which the rate of both decreased. Similarly, when investigating PS20 degradation in mAb-2 at 5° C. over 36 months, released lauric acid correlated with PS20 species measured using LC-CAD, as shown in FIG. 11C; released lauric acid and PS20 degradation increased linearly for approximately the first 12 months, after which the rate of both decreased. Collectively, these findings validate the effectiveness of using fatty acid quantitation as a measurement of PS degradation.

Figure 12A:
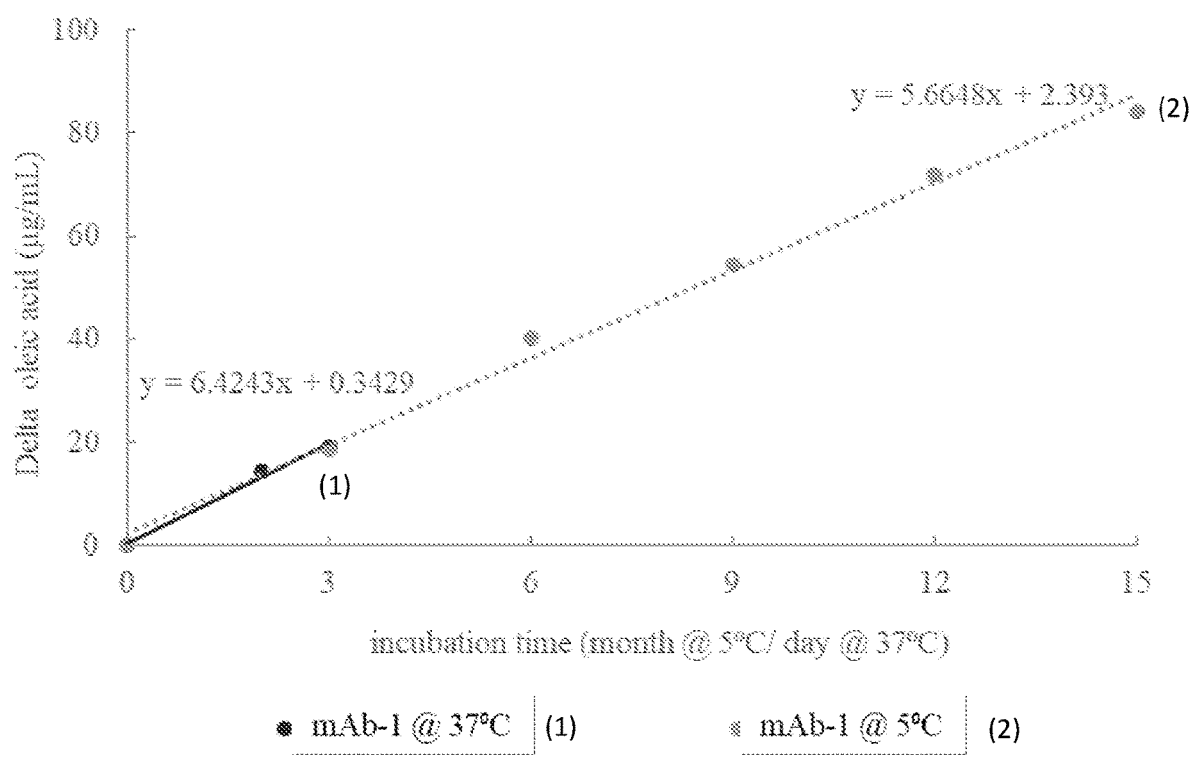
FIG. 12A shows a comparison of the rate of released oleic acid due to PS80 degradation in mAb-1 at 37° C. in days with the rate at 5° C. in months according to an exemplary embodiment. mAb-1 at 37° C. was monitored for 3 days (1) and mAb-1 at 5° C. was monitored for 15 months (2).
Figure 12B:
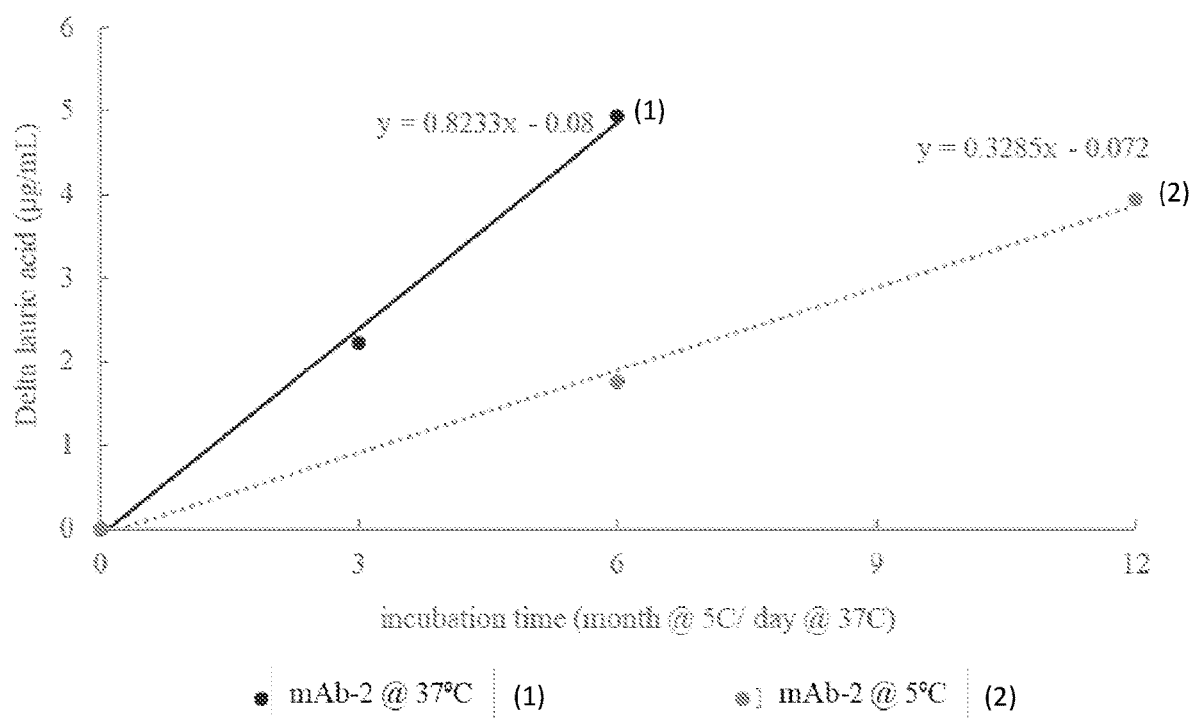
FIG. 12B shows a comparison of the rate of released lauric acid due to PS20 degradation in mAb-2 at 37° C. in days with the rate at 5° C. in months according to an exemplary embodiment. mAb-2 at 37° C. was monitored for 6 days (1) and mAb-1 at 5° C. was monitored for 12 months (2).
Figure 12C:
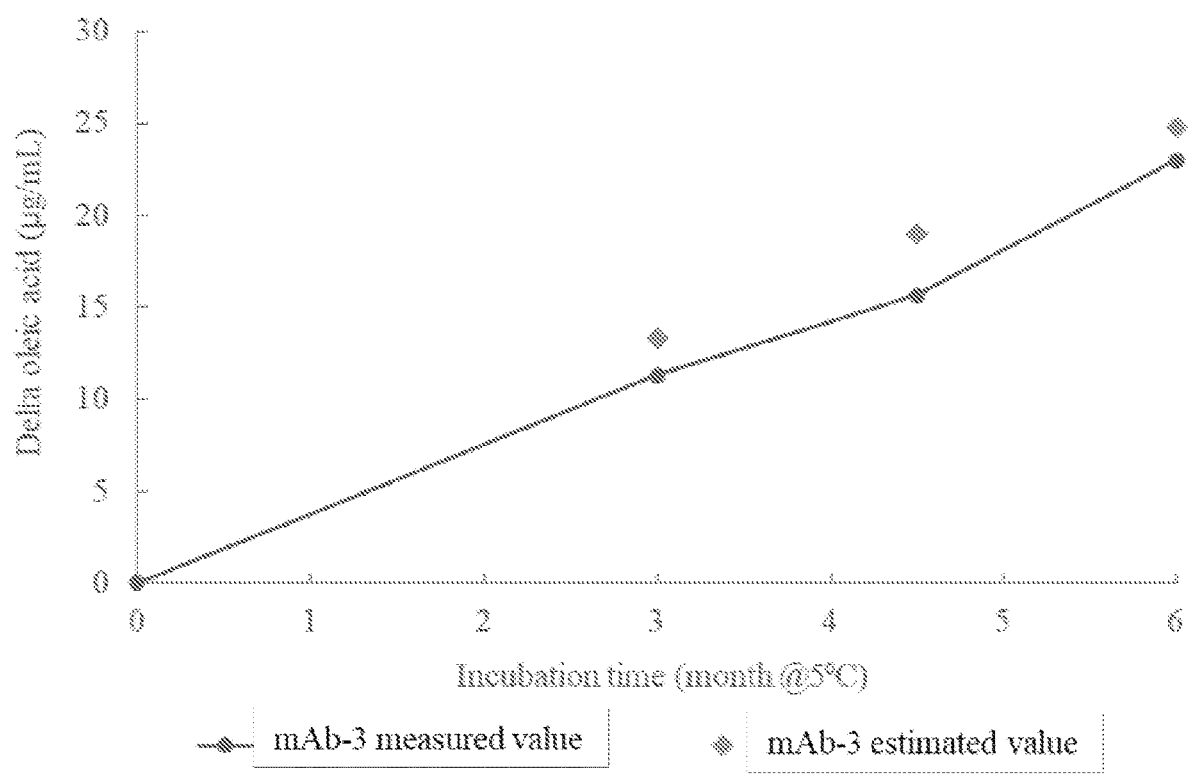
FIG. 12C shows a comparison of the released oleic acid due to PS80 degradation in mAb-3 at 5° C. in months measured by LC-MRM with the estimated value by eq. 1 established based on mAb-1 according to an exemplary embodiment; the dot and trace represents the measured value and the diamonds represent estimated value.
Figure 12D:
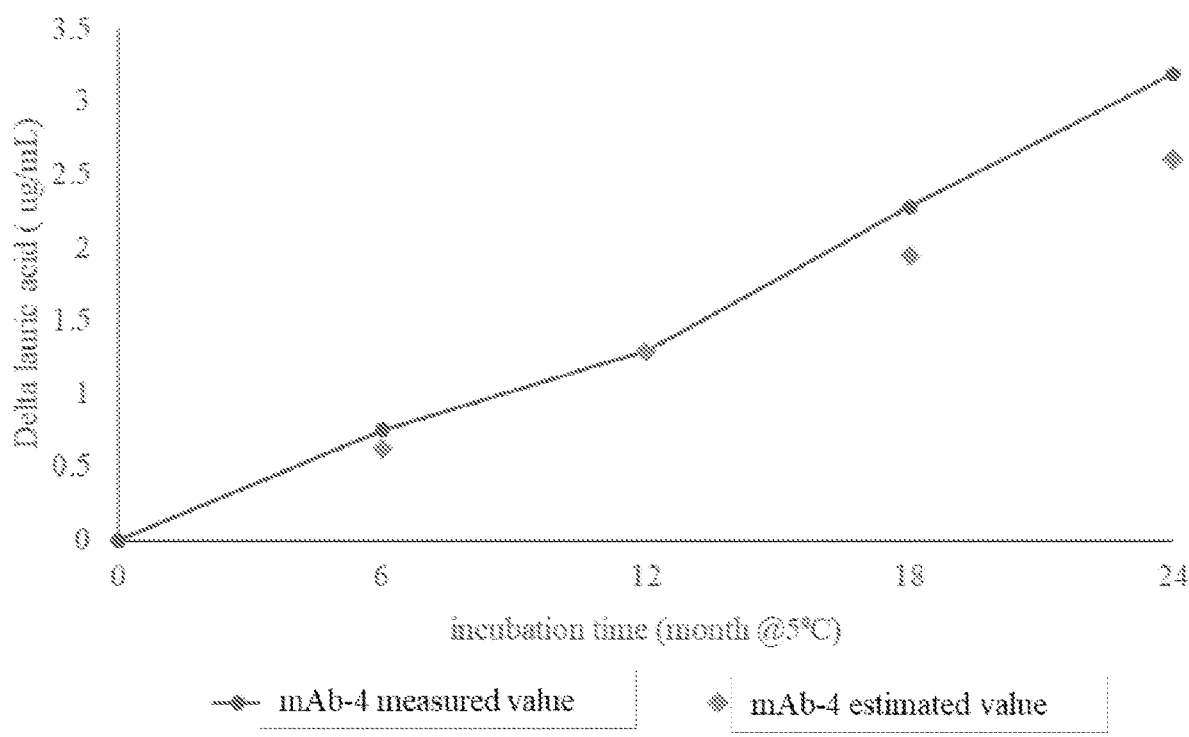
FIG. 12D shows a comparison of the released lauric acid due to PS20 degradation in mAb-4 at 5° C. in months measured by LC-MRM with the estimated value by eq. 2 established based on mAb-2 according to an exemplary embodiment; the dot and trace represents the measured value and the diamonds represent estimated value.

The released free fatty acid concentration rose much more rapidly when stored at a warmer temperature, in a manner predictive of long-term PS degradation at a typical storage temperature. For example, after only a few days, released free fatty acid concentration of PS stored at 37° C. correlates with released free fatty acid concentration of PS stored at 4° C.-8° C. for a few months or years, as shown in FIG. 12A for oleic acid and FIG. 12B for lauric acid.

Based on mAb-1 and mAb-2 stability data, a model was produced for predicting FFA release from a drug product over months of typical storage conditions using measurements from accelerated storage conditions. An equivalent number of months of storage at 5° C. for each day of storage at 37° C., with respect to the release of oleic acid, may be expressed by equation 1 (months @ 5° C.=1.13*days @ 37° C.−0.36). For lauric acid, the same relationship may be expressed by equation 2 (months @ 5° C.=2.51*days @ 37° C.−0.02).

An amount of released FFA under each storage condition as measured by the LC-MRM method of the invention was compared to a predicted amount of released FFA using the model described above, as shown in Table 3 for oleic acid and Table 4 for lauric acid. For predicting an amount of released oleic acid, equation 1 was applied to measured oleic acid concentrations after days of incubation at 37° C. to derive equation 3 (oleic acid concentration (µg/mL) =3.84*months @ 5° C.+1.76). For predicting an amount of released lauric acid, equation 2 was applied to measured lauric acid concentrations after days of incubation at 37° C. to derive equation 4 (lauric acid concentration (µg/mL) =0.11*months @ 5° C.−0.04).

Consequently, these data demonstrate that measuring FFA release over a period of days when stored at 37° C. using the method of the present invention can be used with the present models to predict FFA release, and by extension PS20 or PS80 degradation and lipase activity, over the course of months at typical storage temperatures of 4° C.-8° C.

TABLE 3

Comparison of the released oleic acid due to PS80 degradation in mAb-3 at 5° C. in months measured by LC-MRM with the estimated value by eq. 1 established based on mAb-1.

| mAb-3 Incubation time (day) | Eq. 1 y (mon) = 1.13 × (day) − 0.36 Incubation time (month) | Measured oleic acid (µg/mL) | Estimated oleic acid (µg/mL) | Accuracy |
|---|---|---|---|---|
| 0 | −0.36 | 0 | | |
| 2 | 1.9 | 10.17 | | |
| 3 | 3.03 | 12.65 | | |
| 0 | | 0 | −0.36 | — |
| 3 | | 11.30 | 13.28 | 14.9% |
| 4.5 | | 15.65 | 19.04 | 17.8% |
| 6 | | 22.99 | 24.80 | 7.3% |

TABLE 4

Comparison of the rate of released lauric acid due to PS20 degradation in mAb-4 at 5° C. in months measured by LC-MRM with the estimated value by eq. 2 established based on mAb-2.

| mAb-4 Incubation time (day) | Eq. 2 y (mon) = 2.51 × (day) − 0.02 Incubation time (month) | Measured lauric acid (µg/mL) | Estimated lauric acid (µg/mL) | Accuracy |
|---|---|---|---|---|
| 0 | −0.02 | 0 | | |
| 3 | 7.51 | 0.71 | | |
| 6 | 15.04 | 1.66 | | |
| 0 | | 0 | −0.04 | — |
| 6 | | 0.75 | 0.62 | 16.9% |
| 12 | | 1.29 | 1.28 | 0.4% |
| 18 | | 2.28 | 1.95 | 14.7% |
| 24 | | 3.19 | 2.61 | 18.3% |

Figure 13A:
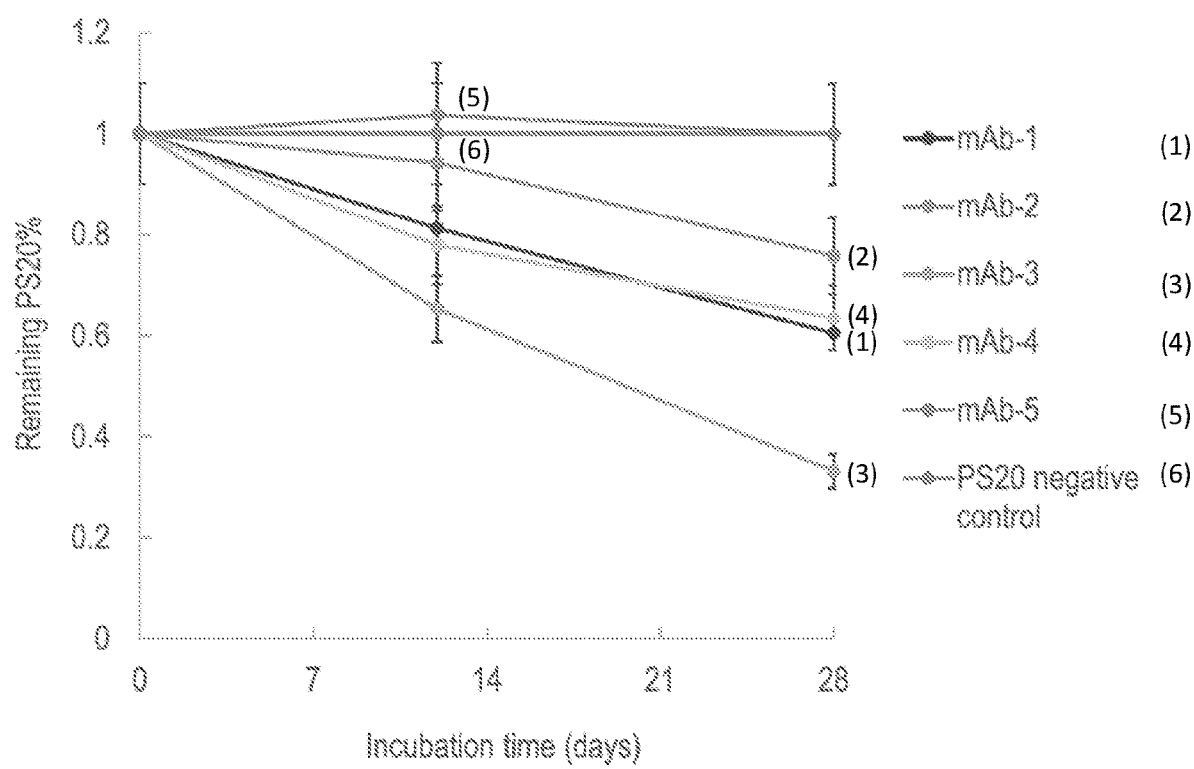
FIG. 13A shows PS20 degradation using 2D-LC-CAD measurement of POE ester species, according to an exemplary embodiment.

Example 6. Case Study of Comparison Between Direct PS Degradation Measurements and Indirect FFA Quantitation Measurements PS20 degradation in five mAbs and a negative control was analyzed by both extraction-based and extraction-free methods to compare the time required to reliably quantify PS20 degradation. All five mAbs contained low levels of active lipase, as shown in FIG. 13. mAb-1 has a LAL concentration below 0.5 ppm. mAb-2 and mAb-3 have the same lipase at slightly different levels, but still below 1 ppm. mAb-4 is an antibody in-process sample with low levels of lipase, and mAb-5 is a final concentrated mAb product (FCP). In this sample, a significant increase in particulates and a continuous decrease in PS20 recovery was observed after storage at 2° C.-8° C. for 18 months, as seen in FIG. 14A and FIG. 14B.

Figure 14A:
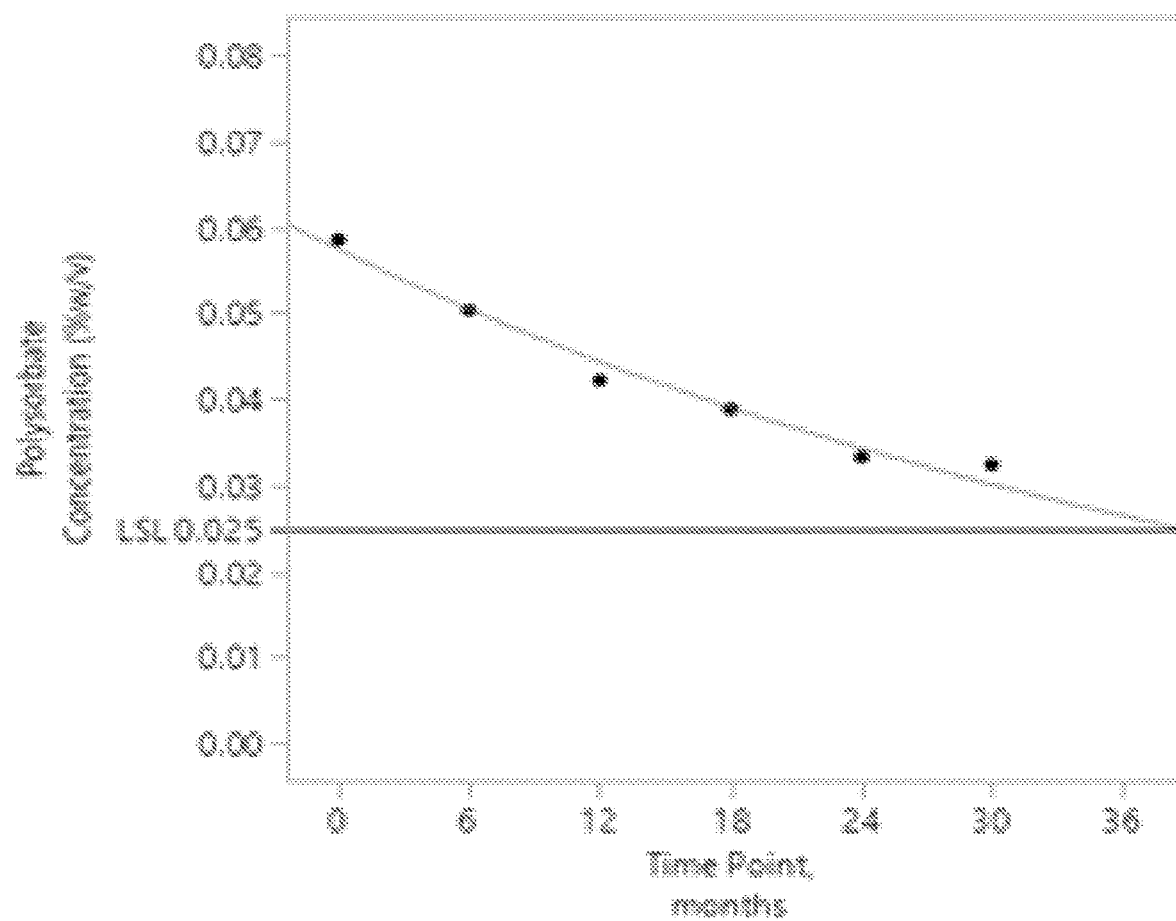
FIG. 14A shows PS20 level in mAb-2 during storage in 36 months at 4° C.-8° C., according to an exemplary embodiment.
Figure 14B:
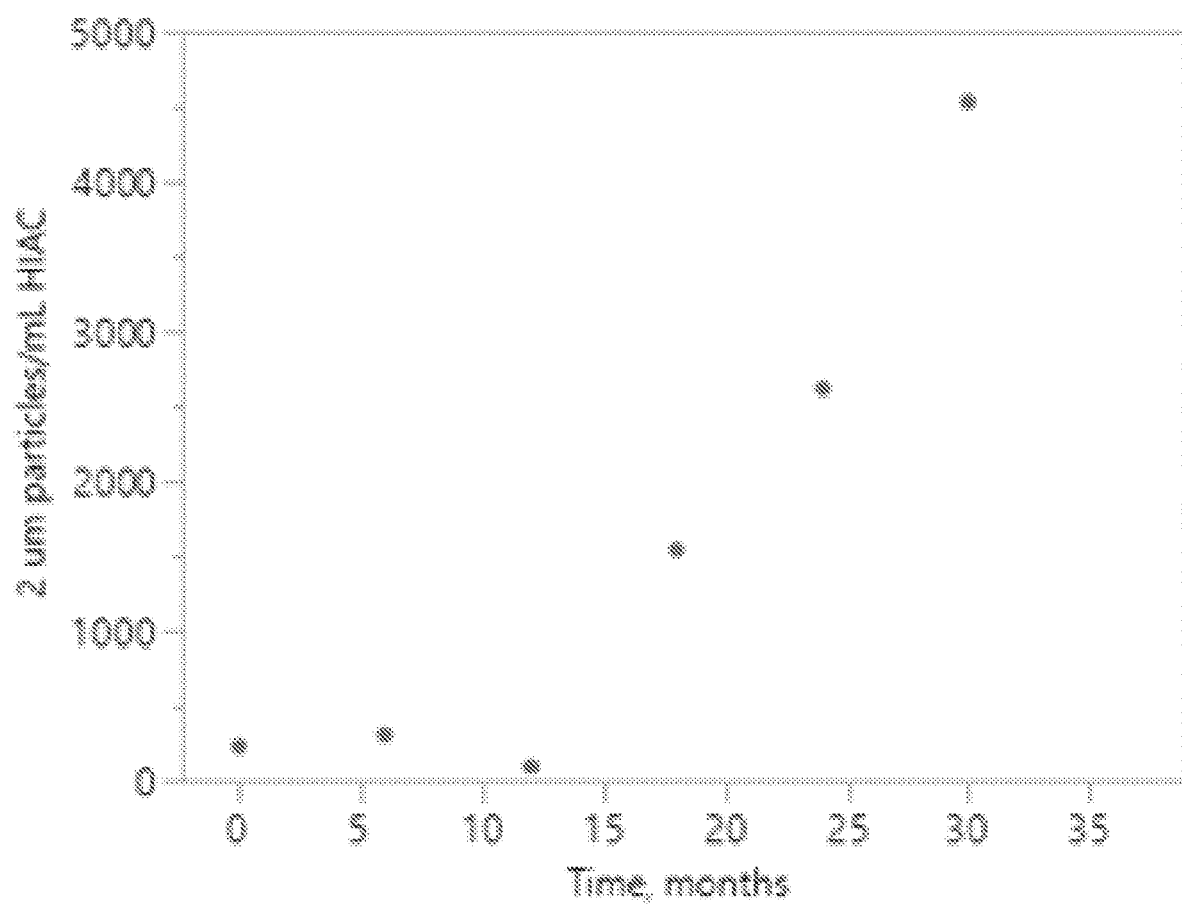
FIG. 14B show 2 µm particles/mL measured in mAb-2 drug product during storage in 36 months at 4° C.-8° C. due to PS20 degradation, according to an exemplary embodiment.
Figure 14C:
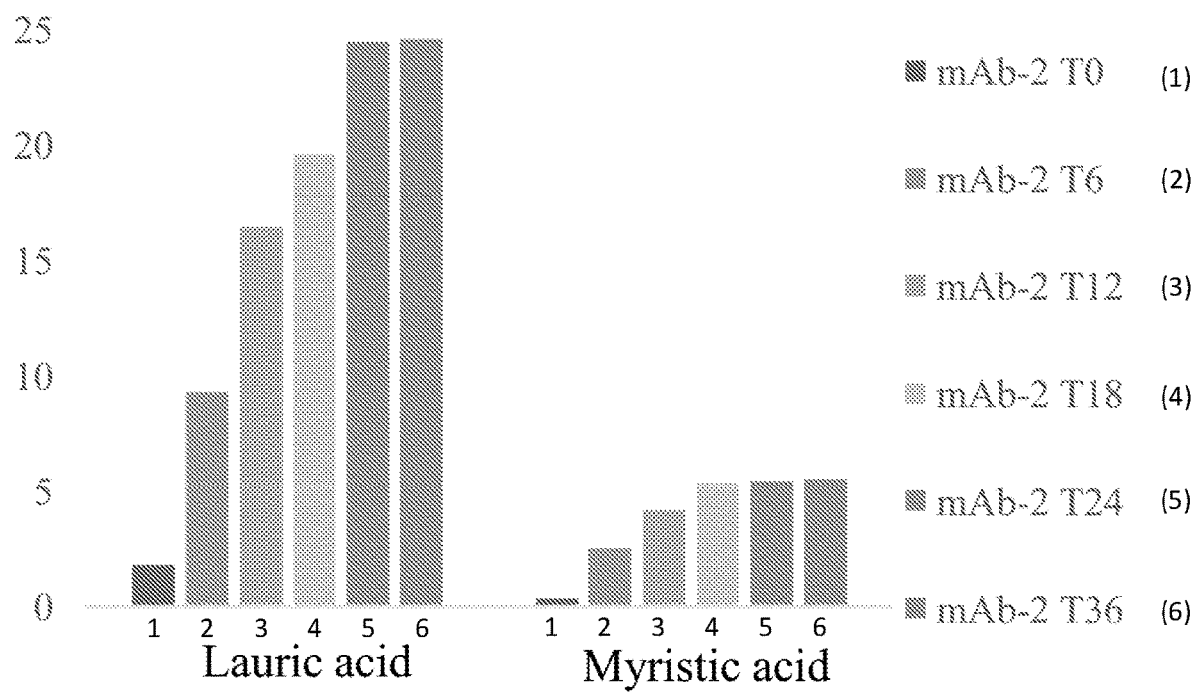
FIG. 14C shows that lauric acid and myristic acid concentration increased in mAb-2 drug product during storage in 36 months at 4° C.-8° C. due to PS20 degradation according to an exemplary embodiment; myristic acid concentration stopped increasing after 18 months (myristic acid: 4) while 2 µm particles increased significantly at $18^{th}$ months, suggesting the shelf life of mAb-2 was limited by the released myristic acid from PS20 degradation.

Particle counts increase due to released FFA exceeding its solubility in drug product, which limits the shelf life of the product. 2 µm particles/mL measured in mAb-2 drug product increased during storage for 36 months at 4° C.-8° C., as shown in FIG. 14B. Conversely, free fatty acid concentration stopped increasing after exceeding its solubility in drug product, as shown in FIG. 14C. The concentration of lauric acid and myristic acid in mAb-2 drug product increased during storage for 36 months at 4° C.-8° C. due to PS20 degradation; however, myristic acid concentration stopped increasing after 18 months, while 2 µm particles increased significantly at 18 months, suggesting that the shelf life of mAb-2 was limited by the released myristic acid from PS20 degradation. Thus, by measuring the fatty acid concentration in the drug product, solubility of FFAs (lauric acid, myristic acid) can be determined and therefore be used to calculate the shelf life of drug products based on the prediction models described above.

Figure 13B:
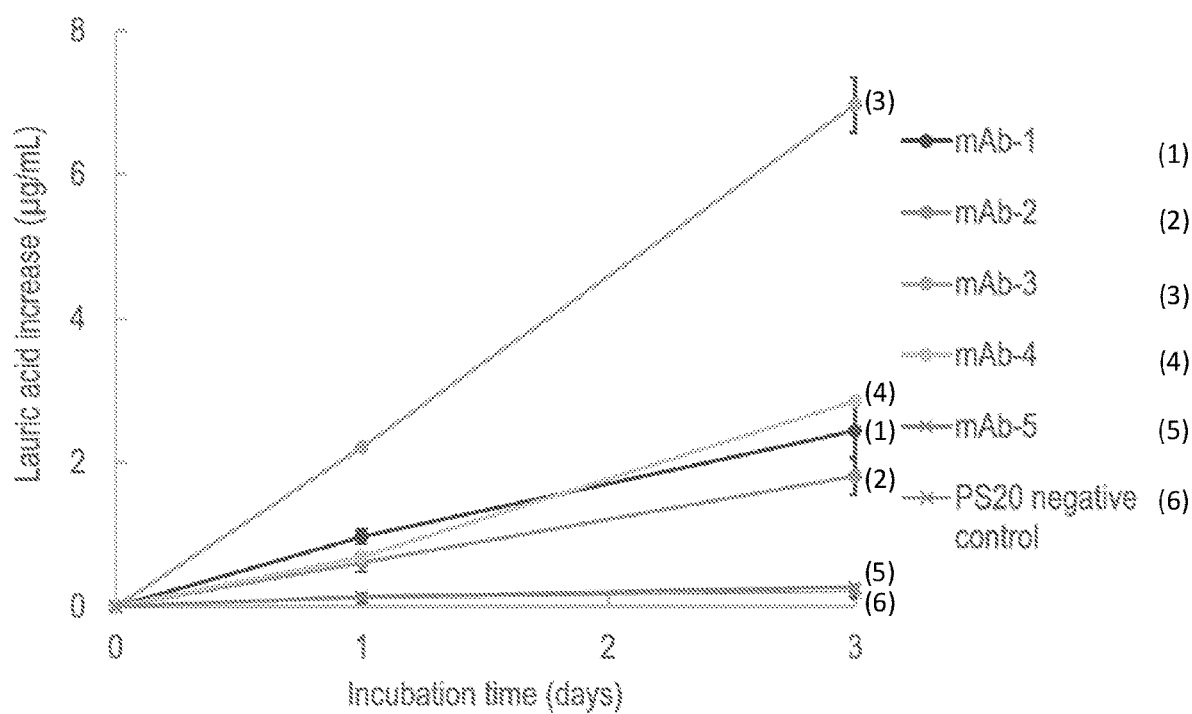
FIG. 13B shows PS20 degradation using extraction-free FFA quantitation, according to an exemplary embodiment.
Figure 15:
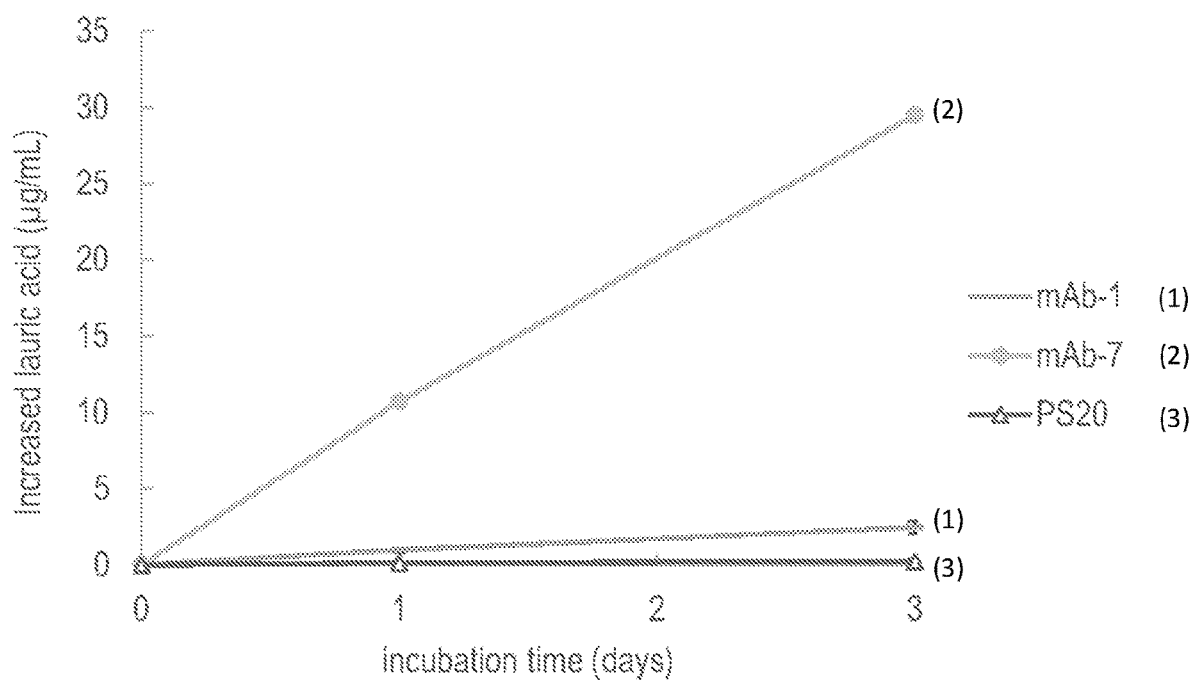
FIG. 15 shows a comparison of quantitation of lauric acid in mAb-1, mAb-7 and PS20 with 3-day incubation at 37° C., according to an exemplary embodiment.

Even for mAbs with such low lipase activity, positive PS20 degradation can be reliably quantitated within 1 day by using FFA quantitation with LC-MRM-MS, as shown in FIG. 13B. For a mAb with higher lipase activity, for example, mAb-7, that did not meet particulate specifications after storage at 2° C.-8° C. for 6 months, lipase activity can be detected within 2 hours of incubation, as shown in FIG. 15. In contrast, the direct PS quantitation method by 2D-LC-CAD requires at least 4 to 19 days in order to surpass the 11% method variation of CAD, as shown in FIG. 13A.

Figure 16A:
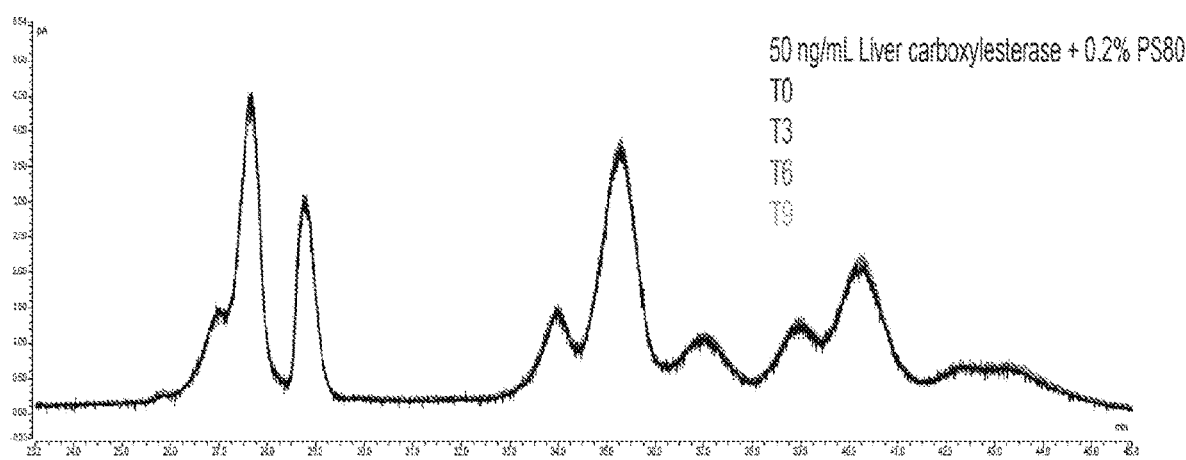
FIG. 16A shows a measurement of POE ester species using 2D-LC-CAD, according to an exemplary embodiment.
Figure 16B:
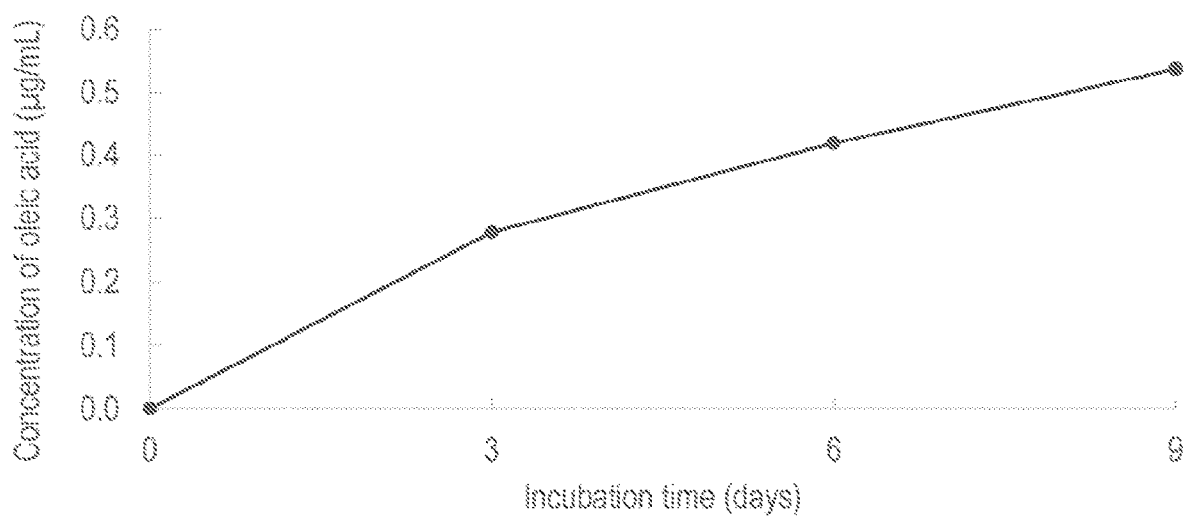
FIG. 16B shows a measurement of free fatty acids using an extraction-free FFA quantitation, according to an exemplary embodiment.

A similar strategy can also be applied for measuring low level of PS80 degradation in mAb formulations. By quantitating the increase of oleic acid released during incubation, trace levels of PS80 degradation can be detected using the method of the present invention, even though this level of change cannot be captured by direct measurement of PS80 content using CAD. For example, liver carboxylesterase (50 ng/mL) was spiked in 200 mg/mL mAb-5 with 0.2% PS80 and incubated at 37° C. for up to 9 days. No decreased level of PS80 was observed after 9 days of incubation with CAD (FIG. 16A), while the increase of oleic acid concentration in mAb (0.279 µg/mL corresponding to 0.0002% PS80 decrease) was clearly detected using the extraction-free method of the invention even with only 3 days of incubation (FIG. 16B).

Polysorbates can undergo hydrolysis caused by residual lipases, leading to undesired particulate formation in drug products or, in extreme cases, degradation resulting in unstable formulations. In most cases, the lipase activity in the final drug product is so low that it may take months or even years before PS degradation can be observed in a stability study using conventional methods. Therefore, there is an urgent need for a rapid, sensitive, and accurate method for measuring PS degradation. This disclosure describes a rapid lipase activity assay that was developed with optimized incubation conditions for accurate quantitation of FFA without a fatty acid extraction step. Low detection limit of lauric acid (22 ng/mL) and oleic acid (211 ng/mL) made it possible to detect as little as 0.000024% PS20 decrease or 0.00016% PS80 decrease by monitoring the increased level of lauric acid or oleic acid. A higher percentage of PS20 was applied compared to previous methods, as it has been shown that this step can preserve the released FFA by preventing adsorption to the incubation container. Glass vials were found to be a better container for incubation, as these containers can also minimize fatty acid adsorption compared with plastic containers. By using heavy-isotope-labeled fatty acids as the ISTD throughout the whole process, one can control for container adsorption effects, thereby ensuring the accuracy of this method.

A comparison was performed between a direct measurement of PS degradation by PS20 quantitation and an indirect measurement of PS20 degradation by quantitation of the released FFAs for a stability sample undergoing PS20 hydrolysis. The concentration increases of the released FFAs and the decrease in PS20 during incubation were demonstrated to be highly correlated, demonstrating that the newly developed method is an accurate measure of PS degradation. The newly developed method offers a much higher sensitivity than 2D-LC-CAD for monitoring PS degradation. In a case study, the time required to detect PS20 degradation in a number of mAbs with low lipase activities was compared for these two methods, and it was demonstrated that the newly developed method can detect low levels of lipase activity in mAb drug products within 1 day. With this new high-throughput assay, PS degradation can be monitored within a few days, a dramatic improvement over previous methods.

Additionally, a model is provided to predict a degradation of polysorbates over the course of months at a typical storage temperature using rapidly measured degradation at accelerated temperatures, allowing for fast and simple predictions of residual lipase activity, PS degradation and product shelf life.

What is claimed is:

1. A method for quantifying free fatty acids in a pharmaceutical formulation, comprising:
    (a) incubating a formulation comprising a pharmaceutical product, polysorbate, and free fatty acids, wherein the concentration of said pharmaceutical product is between about 1 mg/mL and about 200 mg/mL;
    (b) subjecting said formulation to liquid chromatography to separate said free fatty acids; and
    (c) using a mass spectrometer to quantify said free fatty acids,
    wherein said free fatty acids are not extracted from said formulation prior to subjecting said formulation to liquid chromatography.

2. The method of claim 1, further comprising adding internal free fatty acid standards to said formulation prior to incubating the formulation.

3. The method of claim 2, further comprising correcting said quantified free fatty acid concentrations to said internal standards.

4. The method of claim 2, wherein said internal standards are labeled with heavy isotopes.

5. The method of claim 4, wherein said internal standards are selected from a group comprising lauric-$d_{23}$ acid, myristic-$d_{27}$ acid, oleic acid-$^{13}C_{18}$, or a combination thereof.

6. The method of claim 1, further comprising generating a calibration curve using spiked-in fatty acids of known concentration, wherein said quantified free fatty acid concentrations are corrected to said calibration curve.

7. The method of claim 1, further comprising repeating the steps of claim 1 using at least one additional incubation time and comparing the quantification of free fatty acids obtained in each repetition to determine a rate of change of free fatty acid concentration over time.

8. The method of claim 1, wherein said pharmaceutical product is a drug, a nucleic acid, a toxin, a peptide, a protein, a fusion protein, an antibody, an antibody fragment, a Fab region of an antibody, an antibody-drug conjugate, or a protein pharmaceutical product.

9. The method of claim 8, wherein said pharmaceutical product is a monoclonal antibody.

10. The method of claim 1, wherein said polysorbate is polysorbate 20 or polysorbate 80.

11. The method of claim 1, wherein the concentration of said polysorbate is between about 0.001% and about 1%.

12. The method of claim 11, wherein the concentration of said polysorbate is about 1%.

13. The method of claim 1, wherein said free fatty acids are selected from a group comprising caprylic acid, capric acid, lauric acid, myristic acid, palmitic acid, oleic acid, stearic acid, linoleic acid, or a combination thereof.

14. The method of claim 1, wherein the concentration of said free fatty acids is between about 10 ng/ml and about 100 µg/mL.

15. The method of claim 1, wherein said incubation is performed within a plastic tube or within a glass vial.

16. The method of claim 1, wherein said incubation is performed for between about 0 hours and about 36 months.

17. The method of claim 1, wherein said incubation is performed at between about 5° C. and about 37° C.

18. The method of claim 1, wherein said liquid chromatography system is coupled to said mass spectrometer.

19. The method of claim 1, wherein said liquid chromatography is reversed-phased chromatography.

20. The method of claim 19, wherein a column used for said reversed-phase chromatography is an Acquity UPLC BEH C4 column.

21. The method of claim 1, wherein said mass spectrometer is an electrospray ionization mass spectrometer.

22. The method of claim 1, wherein said mass spectrometer is a triple quadrupole mass spectrometer.

23. The method of claim 1, wherein said mass spectrometer is capable of performing LC-MS or LC-MRM-MS analyses.

24. The method of claim 1, wherein said formulation additionally comprises one or more excipients.

25. The method of claim 1, wherein said formulation additionally comprises histidine.

* * * * *